(12) United States Patent
Wen et al.

(10) Patent No.: US 12,528,832 B2
(45) Date of Patent: Jan. 20, 2026

(54) CRYSTALLINE OR AMORPHOUS FORM OF BCL-2/BCL-XL INHIBITOR COMPOUND OR ITS SALTS

(71) Applicants: ASCENTAGE PHARMA (SUZHOU) CO., LTD., Jiangsu (CN); ASCENTAGE PHARMA GROUP CORP LIMITED, Hong Kong (CN)

(72) Inventors: Jianfeng Wen, Jiangsu (CN); Yanqiong Lin, Jiangsu (CN); Jianpeng Feng, Jiangsu (CN); Zhenzhong Shao, Jiangsu (CN); Huirong Lu, Jiangsu (CN); Weidong Li, Jiangsu (CN)

(73) Assignees: ASCENTAGE PHARMA (SUZHOU) CO., LTD., Jiangsu (CN); ASCENTAGE PHARMA GROUP CORP LIMITED, Hong Kong (CN)

( * ) Notice: Subject to any disclaimer, the term of this patent is extended or adjusted under 35 U.S.C. 154(b) by 503 days.

(21) Appl. No.: 18/015,883

(22) PCT Filed: Jul. 12, 2021

(86) PCT No.: PCT/CN2021/105856
§ 371 (c)(1),
(2) Date: Jan. 12, 2023

(87) PCT Pub. No.: WO2022/012481
PCT Pub. Date: Jan. 20, 2022

(65) Prior Publication Data
US 2023/0271986 A1    Aug. 31, 2023

(30) Foreign Application Priority Data

Jul. 13, 2020   (CN) .......................... 202010671412.3

(51) Int. Cl.
*C07F 9/6558* (2006.01)
*A61P 35/00* (2006.01)

(52) U.S. Cl.
CPC .......... *C07F 9/65583* (2013.01); *A61P 35/00* (2018.01); *C07B 2200/13* (2013.01)

(58) Field of Classification Search
None
See application file for complete search history.

(56) References Cited

FOREIGN PATENT DOCUMENTS

| CN | 105246882 A | 1/2016 |
|---|---|---|
| CN | 108025006 A | 5/2018 |
| CN | 110960537 A | 4/2020 |
| WO | 2020140956 A1 | 7/2020 |

OTHER PUBLICATIONS

International Search Report dated Oct. 13, 2021, prepared in International Application No. PCT/CN2021/105856.

*Primary Examiner* — Sarah Pihonak
*Assistant Examiner* — Donna M Nestor
(74) *Attorney, Agent, or Firm* — Barnes & Thornburg LLP

(57) ABSTRACT

Disclosed herein are a crystalline or amorphous form of a Bcl-2/Bcl-xL inhibitor compound or a salt thereof, and a preparation method and application thereof.

21 Claims, 18 Drawing Sheets

CRYSTALLINE OR AMORPHOUS FORM OF BCL-2/BCL-XL INHIBITOR COMPOUND OR ITS SALTS

This application is a National Stage application of International Application No. PCT/CN2021/105856 filed Jul. 12, 2021. This application also claims priority under 35 U.S.C. § 119 to Chinese Patent Application No. 202010671412.3, filed Jul. 13, 2020.

FIELD OF THE INVENTION

The invention belongs to the field of medicinal chemistry, and particularly relates to a crystalline or amorphous form of a Bcl-2/Bcl-xL inhibitor compound or a salt thereof, and a preparation method and application thereof.

BACKGROUND OF THE INVENTION

Apoptosis is the process of programmed cell death and an essential biological process for tissue homeostasis. Apoptosis resistance is a hallmark of human cancer. One of the main ways for cancer cells to evade apoptosis is through up-regulation of anti-apoptotic Bcl-2 family proteins. Targeting key apoptosis regulators to overcome apoptosis resistance and promote tumor cell apoptosis is a new cancer treatment strategy.

The Bcl-2 protein functions as a key regulator of apoptosis in both cancer cells and normal cells. The Bcl-2 protein serves as a check for apoptosis, allowing healthy and useful cells to survive. This protein family includes anti-apoptotic proteins, such as Bcl-2, Bcl-xL, and Mcl-1, and pro-apoptotic molecules, including Bid, Bim, Bad, Bak, and Bax. Although normal cells have low expression levels of anti-apoptotic Bcl-2 and Bcl-xL proteins, these proteins have been found to be highly overexpressed in many different types of human tumors. These overexpressions are related to the poor prognosis of several types of cancer, and are related to clinical resistance to chemotherapeutics and radiation. Consistent with clinical observations, laboratory studies have determined that overexpression of Bcl-2 or Bcl-xL causes cancer cells to become more resistant to chemotherapeutic agents in vitro and in vivo. Therefore, it has been sought to target Bcl-2 and/or Bcl-xL as a cancer treatment strategy. Inhibiting the Bcl-2 activity of cancer cells can reduce chemotherapy resistance and increase cancer cell killing.

Bcl-2 and Bcl-xL proteins inhibit apoptosis by heterodimerization with pro-apoptotic Bcl-2 family proteins such as Bak, Bax, Bim, Bid, Puma, and Bad. The experimentally determined three-dimensional structures of Bcl-xL and Bcl-2 have shown that these proteins have well-defined grooves that interact with the BH3 domain of the pro-apoptotic Bcl-2 protein. It has been proposed that a non-peptide small molecule designed to block the heterodimerization of the Bcl-2/Bcl-xL protein and its pro-death binding partner can be effective as an antagonist of Bcl-2/Bcl-xL, and the small Molecular inhibitors may have great therapeutic potential to treat human cancers in which Bcl-2 and/or Bcl-xL are highly expressed.

These discoveries make possible new strategies for drug discovery targeting cancer.

WO2014/113413A1 discloses a small molecule Bcl-2/Bcl-xL inhibitor for inducing apoptosis of cancer cells expressing Bcl-2 and/or Bcl-xL, and specifically discloses representative compounds: (R)-3-(1-(3-(4-(N-(4-(4-(3-(2-(4-chlorophenyl)-1-isopropyl-5-methyl-4-(methylsulfonyl)-1H-pyrrol-3-yl)-5-fluorophenyl)piperazin-1-yl)phenyl) sulfamoyl)-2-(trifluoromethylsulfonyl)phenylamino)-4-(phenylthio)buty       1)piperidine-4-carbonyloxy) propylphosphonic acid (Hereinafter referred to as the compound of formula 1), Its structural formula is as follows:

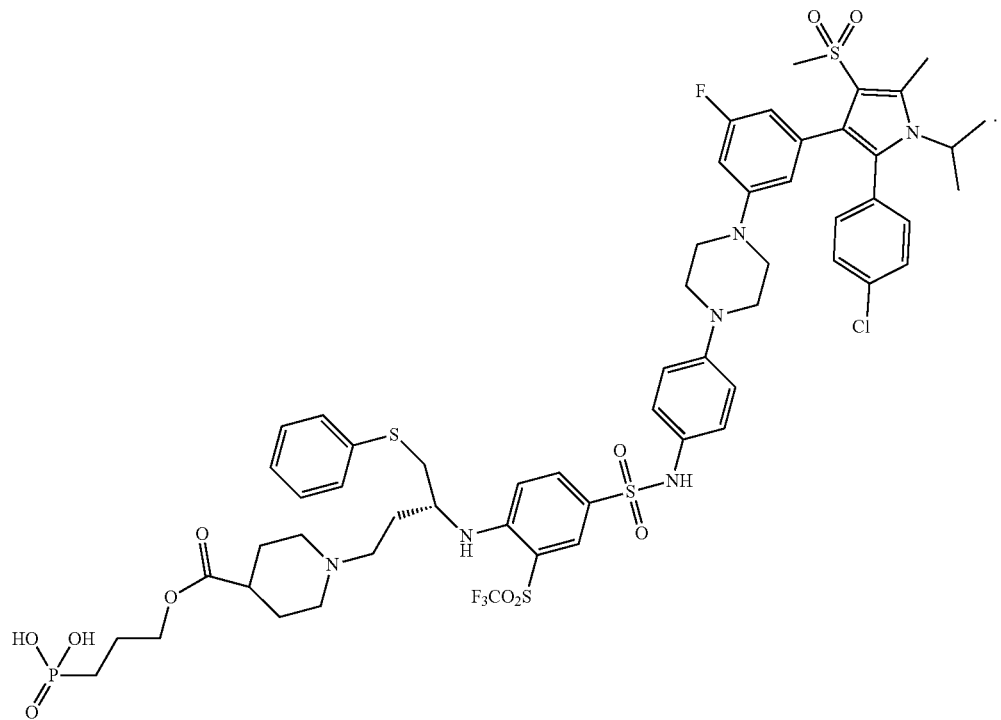

However, the current literature including the patent application mainly reports the structure and pharmacological activity of this type of compound, and has not conducted any research and report on its polymorphism, Amorphous and other structural polymorphisms.

Due to the influence of various factors such as molecular structure configuration, conformation, molecular arrangement, molecular force, eutectic substance, etc., solid materials cause the spatial arrangement of molecular lattices to be different, forming two or more different crystal structures. This phenomenon It is called "Polymorphism Phenomenon" or "Phenomenon". "Polymorphism" is widespread in solid drugs, and there may be differences in physical and chemical properties between different crystal forms of the same drug, such as appearance, density, hardness, melting point, solubility, stability, dissolution rate, dissolution rate, bioavailability, etc. There may be significant differences, and this phenomenon is particularly obvious in oral solid preparations. In addition, the existence and quantity of polymorphic compounds are unpredictable. Different crystalline forms of the same drug may have significant differences in solubility, melting point, density, stability, etc., thereby affecting the uniformity and biological characteristics of the drug to varying degrees. Utilization, efficacy and safety, etc.

In addition to crystal forms, some solid compounds may also have Amorphous forms. Amorphous refers to the structure of some non-completely crystalline Amorphous regions (amorphous regions) or the formation of some Amorphous solids (amorphous). For a specific solid drug, the existence and quantity of its Amorphous form are also unpredictable, and may also have a significant impact on the solubility, melting point, density, and stability of the drug. Therefore, in the process of new drug development, a comprehensive screening of crystalline and amorphous forms of drug compounds is required, considering multiple factors.

In particular, for the above-mentioned compound of formula 1 used as a Bcl-2/Bcl-xL inhibitor, the development of a crystalline form or an Amorphous form of the compound or its salt that can improve the stability, solubility, and bioavailability of the compound have potential medicinal and clinical value.

SUMMARY OF THE INVENTION

The invention provides a crystalline form or amorphous form of a Bcl-2/Bcl-xL inhibitor compound or a salt thereof, and a preparation method and application thereof. The crystalline form or Amorphous form of the present invention has very important value for drug development, formulation development and production.

In the following description, certain specific details are set forth in order to provide a thorough understanding of various embodiments of the present invention. However, those skilled in the art will understand that the present invention can be practiced without these details. The following description of several embodiments is made with the understanding that the present disclosure is regarded as an example of the claimed subject matter, and is not intended to limit the appended claims to the specific embodiments shown. The headings used throughout the present invention are provided for convenience only and should not be construed as limiting the claims in any way. The embodiment shown under any heading can be combined with the embodiment shown under any other heading.

In addition, when referring to, for example, XRPD diagrams, TGA diagrams, MDSC, DSC diagrams, etc., the term "substantially as shown" means that it is not necessarily the same as those described herein, but when considered by a person of ordinary skill in the art, The spectrum that falls within the limits of experimental error or deviation.

In one aspect, the present invention provides a crystalline or Amorphous form of the compound of formula 1 or its salts:

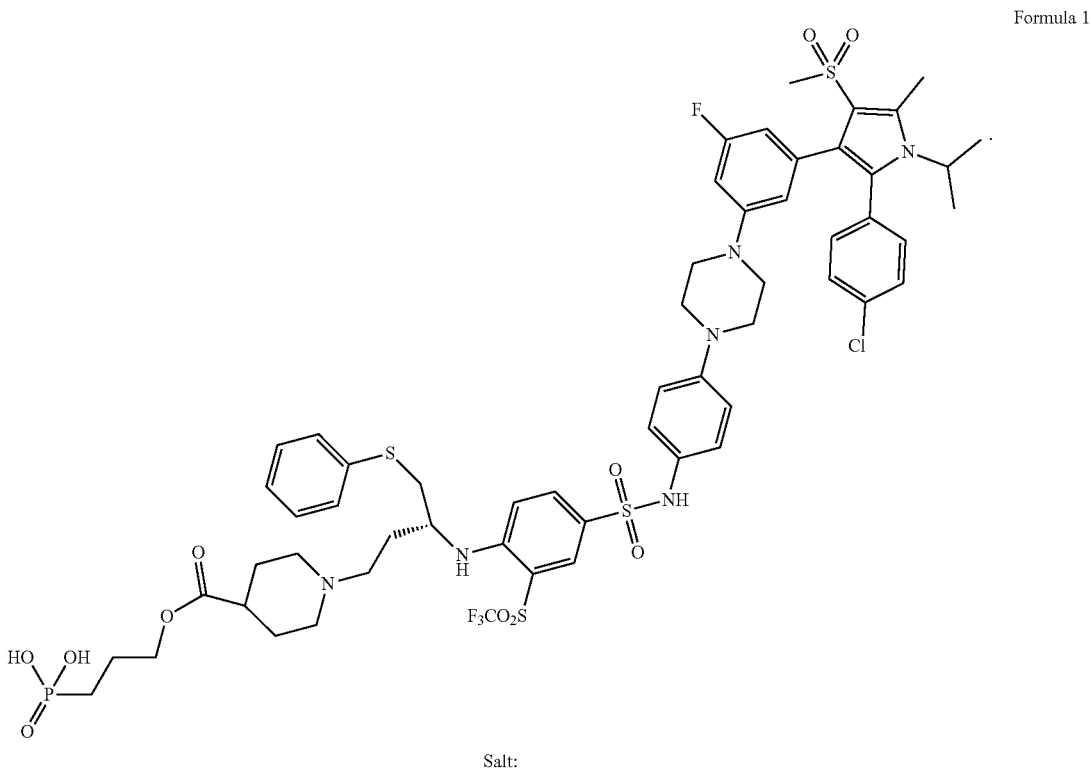

Formula 1

Salt:

The chemical name of the compound is (R)-3-(1-(3-(4-(N-(4-(4-(3-(2-(4-chlorophenyl)-1-isopropyl-5-methyl-4-(methylsulfonyl)-1H-pyrrol-3-yl)-5-fluorophenyl)piperazin-1-yl)phenyl) sulfamoyl)-2-(trifluoromethylsulfonyl)phenylamino)-4-(phenylthio)buty 1)piperidine-4-carbonyloxy)propylphosphonic acid. Specifically, the form may be the following specific forms:

1) The Compound of Formula 1 Fumarate Crystalline Form I

In one embodiment, the form is the crystalline form I of the fumarate salt of the compound of formula 1, which is characterized in that it has characteristic peaks at the following positions in an X-ray powder diffraction (XRPD) pattern expressed by an angle of 2θ: 18.03±0.2°, 28.81±0.2° and 31.88±0.2°.

In some preferred embodiments, the form has XRPD characteristic peaks at positions basically as shown in Table 1 below and/or an X-ray powder diffraction (XRPD) pattern basically as shown in FIG. 1.

TABLE 1

| position [°2θ] ±0.2° | d-[Å] | Relative Strength [%] |
|---|---|---|
| 18.03 | 4.92 | 27.59 |
| 28.81 | 3.10 | 100.00 |
| 31.88 | 2.80 | 14.16 |

In some preferred embodiments, the form also has the following characteristics:
1) In the Modulated Differential Scanning Calorimetry (MDSC), there is an endothermic peak at 217.4±2.0° C.; and/or
2) Basically the MDSC chart shown in FIG. 2.

2) The Compound of Formula 1 Hydrochloride Crystalline Form II

In one embodiment, the form is the crystalline form II of the hydrochloride salt of the compound of formula 1, which is characterized in that it has at least three, at least four, or five characteristic peaks at the following positions in the XRPD diagram represented by an angle of 2θ: 13.01±0.2°, 21.55±0.2°, 25.95±0.2°, 31.33±0.2° and 37.34±0.2°.

In some preferred embodiments, the form has XRPD characteristic peaks at positions basically as shown in Table 2 below and/or an XRPD pattern basically as shown in FIG. 3.

TABLE 2

| position[°2θ] ±0.2° | d-[Å] | Relative Strength [%] |
|---|---|---|
| 13.01 | 6.80 | 100.00 |
| 21.55 | 4.12 | 10.54 |
| 25.95 | 3.43 | 4.66 |
| 31.33 | 2.86 | 23.42 |
| 37.34 | 2.41 | 22.75 |

In some preferred embodiments, the form also has the following characteristics:
1) In the MDSC chart, there is an endothermic peak at 148.2±2.0° C. and a glass transition temperature at 139.5±2.0° C.; and/or
2) Basically the MDSC chart shown in FIG. 4.

3) The Compound of Formula 1 Nicotinate Crystalline Form III

In one embodiment, the form is the nicotinic acid salt crystalline form III of the compound of formula 1, which is characterized in that it has characteristic peaks at the following positions in the XRPD diagram expressed at 2θ angles: 15.46±0.2° and 18.06±0.2°.

In some preferred embodiments, the form has XRPD characteristic peaks at positions basically as shown in Table 3 below and/or an XRPD pattern basically as shown in FIG. 5.

TABLE 3

| position[°2θ] ±0.2° | d-[Å] | Relative Strength [%] |
|---|---|---|
| 15.46 | 5.73 | 84.62 |
| 18.06 | 4.91 | 100.00 |

In some preferred embodiments, the form also has the following characteristics:
1) In the MDSC chart, there is a glass transition temperature at 127.6±2.0° C.; and/or
2) Basically the MDSC chart shown in FIG. 6.

4) The Compound of Formula 1 Sodium Salt Crystalline Form IV

In one embodiment, the form is the sodium salt crystalline form IV of the compound of formula 1, which is characterized in that it has at least three or four characteristic peaks at the following positions in the XRPD diagram represented by an angle of 2θ: 16.75±0.2°, 32.34±0.2°, 33.48±0.2° and 37.95±0.2°.

In some preferred embodiments, the form has XRPD characteristic peaks at positions basically as shown in Table 4 below and/or an XRPD pattern basically as shown in FIG. 7.

TABLE 4

| position[°2θ] ±0.2° | d-[Å] | Relative Strength [%] |
|---|---|---|
| 16.75 | 5.29 | 14.66 |
| 32.34 | 2.77 | 100.00 |
| 33.48 | 2.68 | 29.80 |
| 37.95 | 2.37 | 38.88 |

5) The Compound of Formula 1 Potassium Salt Crystalline Form V

In one embodiment, the form is the crystalline form V of the potassium salt of the compound of formula 1, which is characterized in that it has characteristic peaks at the following positions in the XRPD diagram represented by an angle of 2θ: 24.35±0.2°, 30.10±0.2° and 31.41±0.2°.

In some preferred embodiments, the form has XRPD characteristic peaks at positions basically as shown in Table 5 below and/or an XRPD pattern basically as shown in FIG. 8.

TABLE 5

| position[°2θ] ±0.2° | d-[Å] | Relative Strength [%] |
|---|---|---|
| 24.35 | 3.65 | 61.39 |
| 30.10 | 2.97 | 100.00 |
| 31.41 | 2.85 | 71.30 |

6) The Compound of Formula 1 Crystalline Form VI

In one embodiment, the form is the crystalline form VI of the compound of formula 1, which is characterized in that it has at least three, at least four, or five characteristic peaks at the following positions in the XRPD diagram represented by an angle of 2θ: 3.94±0.2°, 5.09±0.2°, 18.01±0.2°, 19.08±0.2°, 19.70±0.2°.

In some preferred embodiments, the form has XRPD characteristic peaks at positions basically as shown in Table 6 below and/or an XRPD pattern basically as shown in FIG. 9.

TABLE 6

| position[°2θ] ±0.2° | d-[Å] | Relative Strength [%] |
|---|---|---|
| 3.94 | 22.41 | 28.67 |
| 5.09 | 17.38 | 67.19 |
| 6.33 | 13.97 | 13.55 |
| 7.46 | 11.85 | 12.65 |
| 10.29 | 8.60 | 18.51 |
| 11.79 | 7.51 | 10.13 |
| 12.30 | 7.19 | 4.37 |
| 14.93 | 5.93 | 3.77 |
| 16.53 | 5.36 | 9.95 |
| 17.37 | 5.11 | 19.42 |
| 18.01 | 4.92 | 31.29 |
| 19.08 | 4.65 | 30.78 |
| 19.70 | 4.51 | 100.00 |
| 21.95 | 4.05 | 8.03 |
| 22.59 | 3.94 | 11.80 |
| 23.25 | 3.82 | 6.43 |
| 23.70 | 3.75 | 6.57 |
| 24.55 | 3.62 | 4.76 |
| 25.57 | 3.48 | 8.31 |
| 25.95 | 3.43 | 7.52 |
| 26.89 | 3.32 | 5.17 |
| 28.33 | 3.15 | 3.31 |
| 30.46 | 2.94 | 3.22 |

In some preferred embodiments, the form also has the following characteristics:
1) In the Thermogravimetric Analysis (TGA), there is a weight loss of 7.01±0.2% by weight before 160° C.;
2) In the DSC chart, there are two endothermic peaks at 78.8±2.0° C. and 162.5±2.0° C.;
3) Basically the TGA diagram shown in FIG. 10; and/or
4) Basically the DSC chart shown in FIG. 11.

7) The Compound of Formula 1 Crystalline Form VII

In one embodiment, the form is the crystalline form VII of the compound of formula 1, which is characterized in that it has at least three, at least four, or five characteristic peaks at the following positions in the XRPD diagram represented by an angle of 2θ: 20.18±0.2°, 20.74±0.2°, 29.20±0.2°, 29.28±0.2° and 36.73±0.2°.

In some preferred embodiments, the form has XRPD characteristic peaks at positions basically as shown in Table 7 below and/or an XRPD pattern basically as shown in FIG. 12.

TABLE 7

| position[°2θ] ±0.2° | d-[Å] | Relative Strength [%] |
|---|---|---|
| 11.65 | 7.60 | 5.60 |
| 18.84 | 4.71 | 12.07 |
| 20.18 | 4.40 | 100.00 |
| 20.74 | 4.28 | 53.63 |
| 22.53 | 3.95 | 9.47 |
| 23.42 | 3.80 | 1.38 |
| 25.08 | 3.55 | 14.74 |
| 27.77 | 3.21 | 3.99 |
| 29.20 | 3.06 | 40.14 |
| 29.28 | 3.06 | 20.80 |
| 29.76 | 3.00 | 11.73 |
| 32.05 | 2.79 | 5.38 |

TABLE 7-continued

| position[°2θ] ±0.2° | d-[Å] | Relative Strength [%] |
|---|---|---|
| 32.87 | 2.72 | 2.09 |
| 33.45 | 2.68 | 10.03 |
| 35.40 | 2.53 | 3.74 |
| 35.86 | 2.50 | 16.39 |
| 35.95 | 2.50 | 8.23 |
| 36.25 | 2.48 | 14.09 |
| 36.73 | 2.44 | 27.23 |
| 36.82 | 2.45 | 13.20 |
| 37.45 | 2.40 | 15.30 |
| 37.54 | 2.40 | 8.66 |
| 38.53 | 2.33 | 2.79 |
| 38.95 | 2.31 | 2.89 |

In some preferred embodiments, the form also has the following characteristics:
1) In the DSC chart, there are two endothermic peaks at 77.5±2.0° C. and 195.7±2.0° C.; and/or
2) Basically the DSC chart shown in FIG. 13.

8) Compound of Formula 1 Crystalline Form VIII

In one embodiment, the form is the crystalline form VIII of the compound of formula 1, which is characterized in that it has a characteristic peak at the following position in the XRPD diagram represented by an angle of 2θ: 18.11±0.2°.

In some preferred embodiments, the form has XRPD characteristic peaks at positions basically as shown in Table 8 below and/or an XRPD pattern basically as shown in FIG. 14.

TABLE 8

| position[°2θ] ±0.2° | d-[Å] | Relative Strength [%] |
|---|---|---|
| 18.11 | 4.89 | 100.00 |

In some preferred embodiments, the form also has the following characteristics:
1) In the TGA chart, there is a weight loss of 7.59±0.2% by weight before 150° C.;
2) In the DSC chart, there are two endothermic peaks at 69.3±2.0° C. and 152.1±2.0° C.;
3) Basically the TGA diagram shown in FIG. 15; and/or
4) Basically, the DSC chart shown in FIG. 16.

9) Compound of Formula 1 Adipate Amorphous Form IX

In one embodiment, the form is the Amorphous Form IX of the adipate salt of the compound of Formula 1, which is characterized in that it has an XRPD pattern basically as shown in FIG. 17.

In some preferred embodiments, the form also has the following characteristics:
1) In the MDSC chart, there is a glass transition temperature at 113.4±2.0° C.; and/or
2) Basically the MDSC chart shown in FIG. 18.

10) Compound of Formula 1 Fumarate Amorphous Form X

In one embodiment, the form is the fumarate Amorphous form X of the compound of formula 1, which is characterized in that it has an XRPD pattern basically as shown in FIG. 19.

In some preferred embodiments, the form also has the following characteristics:
1) In the MDSC chart, there is a glass transition temperature at 136.6±2.0° C.; and/or
2) Basically the MDSC chart shown in FIG. 20.

11) Compound of Formula 1 Nicotinate Amorphous Form XI

In one embodiment, the form is the Amorphous form XI of the compound nicotinate of formula 1, which is characterized in that it has an XRPD pattern basically as shown in FIG. 21.

In some preferred embodiments, the form also has the following characteristics:
1) In the MDSC chart, there is a glass transition temperature at 117.9±2.0° C.; and/or
2) Basically the MDSC chart shown in FIG. 22.

12) Compound of Formula 1 Potassium Salt Amorphous Form XII

In one embodiment, the form is the amorphous form XII of the potassium salt of the compound of formula 1, which is characterized in that it has an XRPD pattern basically as shown in FIG. 23.

In some preferred embodiments, the form also has the following characteristics:
1) In the MDSC chart, there is a glass transition temperature at 135.7±2.0° C.; and/or
2) Basically the MDSC chart shown in FIG. 24.

13) Compound of Formula 1 Sodium Salt Morphous Form XIII

In one embodiment, the form is the amorphous Form XIII of the sodium salt of the compound of formula 1, which is characterized in that it has an XRPD pattern substantially as shown in FIG. 25.

In some preferred embodiments, the form also has the following characteristics:
1) In the MDSC chart, there is a glass transition temperature at 140.9±2.0° C.; and/or
2) Basically the MDSC chart shown in FIG. 26.

14) Amorphous Form of Compound of Formula 1 XIV

In one embodiment, the form is the amorphous form XIV of the compound of formula 1, which is characterized in that it has an XRPD pattern substantially as shown in FIG. 27.

In some preferred embodiments, the form also has the following characteristics:
1) In the MDSC chart, there is a glass transition temperature at 148.9±2.0° C.;
2) In the TGA chart, there is a weight loss of 6.35±0.2% by weight before 200° C.;
3) Basically the MDSC chart shown in FIG. 28; and/or
4) Basically the TGA diagram shown in FIG. 29.

15) Compound of Formula 1 Maleate Salt Morphous Form XV

In one embodiment, the form is the amorphous form XV of the maleate salt of the compound of formula 1, which is characterized in that it has an XRPD pattern substantially as shown in FIG. 30.

In some preferred embodiments, the form also has the following characteristics:
1) In the MDSC chart, there is a glass transition temperature at 91.89±2.0° C.;
2) In the TGA chart, there is a weight loss of 8.767±0.2% by weight before 223.63° C.;
3) Basically the MDSC chart shown in FIG. 31; and/or
4) Basically the TGA diagram shown in FIG. 32.

16) Compound of Formula 1 Meglumine Salt Morphous Form XVI

In one embodiment, the form is the amorphous form XVI of the meglumine salt of the compound of formula 1, which is characterized in that it has an XRPD pattern substantially as shown in FIG. 33.

In some preferred embodiments, the form also has the following characteristics:
1) In the MDSC chart, there is a glass transition temperature at 66.19±2.0° C.;
2) In the TGA chart, there is a weight loss of 2.416±0.2% by weight before 124.19° C.; a weight loss of 2.774±0.2% by weight between 187.71° C. and 124.19° C.;
3) Basically the MDSC chart shown in FIG. 34; and/or
4) Basically the TGA diagram shown in FIG. 35.

In the second aspect, the present invention provides a method for preparing the crystalline or amorphous form of the compound of formula 1 or its salt.

In one embodiment, the present invention provides a method for preparing the crystalline form of the salt of the compound of formula 1, which comprises the following steps: mixing the compound of formula 1 with a solvent and an acid or base, and slowly volatilizing the resulting solution at room temperature to obtain the formula 1 The crystalline form of the salt of the compound.

The solvent can be a solvent commonly used in laboratories, such as one or more of water, alkane, alcohol, ketone, ester, aromatic hydrocarbon, halogenated hydrocarbon, nitrile, ether, aliphatic hydrocarbon solvents and polar aprotic solvents, such as DMF and DMSO. The mass-volume ratio of the compound of formula 1 to the solvent can be 100 mg: (0.1-10 mL).

The acid may be a pharmaceutically acceptable acid or an acid commonly used in the art, and may be an inorganic acid or an organic acid. Further preferably, the acid may be fumaric acid, hydrochloric acid, niacin, maleic acid and the like. The base may be a pharmaceutically acceptable base or a base commonly used in the art. Further preferably, the alkali may be sodium hydroxide, potassium hydroxide, meglumine and the like.

In one embodiment, the present invention provides the preparation of the crystalline form VI of the compound of formula 1, which includes the following steps: dissolving the compound of formula 1 in acetone, then adding methanol and stirring, and separating the resulting solid to obtain crystalline form VI of the compound of formula 1.

In one embodiment, the present invention provides the preparation of crystalline form VII of the compound of formula 1, which comprises the following steps: dissolving the compound of formula 1 in ethyl acetate, then adding L-malic acid and stirring, and separating the resulting solid to obtain crystalline form VII of the compound of formula 1.

In one embodiment, the present invention provides the preparation of the crystalline form VIII of the compound of formula 1, which includes the following steps: adding the compound of formula 1 to a tetrahydrofuran/n-hexane mixed solvent, and after stirring, the resulting solid is separated to obtain crystalline form VIII of the compound of formula 1.

In one embodiment, the present invention provides a method for preparing the Amorphous form of the salt of the compound of formula 1, which comprises the following steps: mixing the compound of formula 1 with a solvent and an acid or base, and separating the resulting solid to obtain Amorphous form of the salt of the compound of formula 1

The solvent can be a solvent commonly used in laboratories, such as: One or more of water, alkane, alcohol, ketone, ester, aromatic hydrocarbon, halogenated hydrocarbon, nitrile, ether, aliphatic hydrocarbon solvents and polar aprotic solvents, such as DMF and DMSO. The mass-volume ratio of the compound of formula 1 to the solvent can be 100 mg: (0.1-10 mL).

The acid may be a pharmaceutically acceptable acid or an acid commonly used in the art, and may be an inorganic acid or an organic acid. Further preferably, the acid may be fumaric acid, hydrochloric acid, niacin, maleic acid and the like. The base may be a pharmaceutically acceptable base or a base commonly used in the art. Further preferably, the alkali may be sodium hydroxide, potassium hydroxide, meglumine and the like.

In one embodiment, the present invention provides a method for preparing the Amorphous form XIV of the compound of formula 1, which comprises the following steps: adding the compound of formula 1 to a solvent to obtain a solution, then adding the resulting solution to an anti-solvent, and separating the obtained solid to obtain the Amorphous form XIV of the compound of formula 1.

Optionally, the solvent is selected from one or more of ethyl acetate, acetone, tetrahydrofuran, acetonitrile, DMSO, 1,4-dioxane, MIBK, dichloromethane, and DMF; and/or the The anti-solvent is selected from one or more of heptane, ethanol, water, IPAc, IPA, butanol, and NPA.

In each of the above preparation methods, the preparation temperature can be a temperature that can be conventional in the art, for example, 20-50° C.

In the above preparation methods, the crystallization time is not particularly limited, as long as the crystals can be precipitated, for example, the crystallization time can be 1-48 h.

In addition, the preparation method of the crystalline form or the amorphous form of the compound of formula 1 or its salt may also be a method well known in the art, such as solvent volatilization method, suspension stirring method, heating and cooling crystallization method, and mixed solvent crystallization method. The solvent volatilization method of the present invention is to volatilize the clear solution of the sample at different temperatures until the solvent is volatilized to dryness. The suspension stirring method of the present invention is to stir the supersaturated solution of the sample (with undissolved solids) in different solvents for a period of time. The heating and cooling crystallization method of the present invention is to dissolve the sample in an appropriate solvent under high temperature conditions, and after filtering, the filtrate is stirred and precipitated in a room temperature or low temperature environment. The mixed solvent crystallization method of the present invention is to take a sample and dissolve it in an appropriate solvent, add another or more solvents, and precipitate a solid system for a short time after stirring and filtering.

In the third aspect, the present invention provides a pharmaceutical composition comprising the crystalline or amorphous form of the compound of formula 1 or its salt, and pharmaceutically acceptable excipients.

The compound of formula 1 or its salt, crystalline form or amorphous form of a solvate may be a therapeutically effective amount. The pharmaceutically acceptable excipients may be well-known excipients in the art. In the case of solid preparations, they include, but are not limited to: diluents, binders, disintegrants, lubricants, glidants, release rate control agents, plasticizers, preservatives, antioxidants, etc.

The pharmaceutical composition can be selected in a dosage form suitable for human consumption, such as: tablets, capsules, granules, powders or pills, etc., preferably tablets, capsules, granules, disintegrating tablets, sustained-release or controlled-release tablets etc.

The pharmaceutical composition of the present invention can be prepared by various methods well known in the art, and a therapeutically effective amount of one or more of the crystalline form or the amorphous form of the compound of formula 1 or its salt can be combined with one or more a variety of pharmaceutically acceptable excipients are mixed to prepare a dosage form suitable for human consumption, such as tablets, capsules, and granules.

"Therapeutically effective amount" refers to the amount of the compound form according to the present invention, which when administered to a patient in need thereof, is sufficient to achieve the treatment of a disease state, condition or disorder for which the compound is effective. Such an amount will be sufficient to elicit the biological or medical response of the tissue system or patient sought by the researcher or clinician.

In the fourth aspect, the present invention provides a crystalline form or Amorphous form of the compound of the above formula 1 or its salt or the above pharmaceutical composition for use in the treatment or prevention of diseases in which the inhibition of Bcl-2 or Bcl-xL provides benefits in medicine.

In one embodiment, the disease in which the inhibition of Bcl-2 or Bcl-xL provides benefit is cancer.

The crystalline form or amorphous form of the compound of formula 1 or its salt of the present invention has the following advantages:

1. In the present invention, a variety of unreported crystalline forms or amorphous forms of the compound of formula 1 or its salts have been discovered for the first time, and the forms can be used as an important basis for subsequent drug development, formulation development and production.
2. Various forms of the present invention including the amorphous form XIV of the compound of formula 1, the meglumine salt amorphous form XVI and the crystalline form VI of the compound of formula 1 have good physical and chemical stability.
3. The present invention improves the preparation method of the crystalline form VI of the compound of formula 1, thereby improving the purity of the product.

SPECIFIC IMPLEMENTATION

Example

Figure 1:
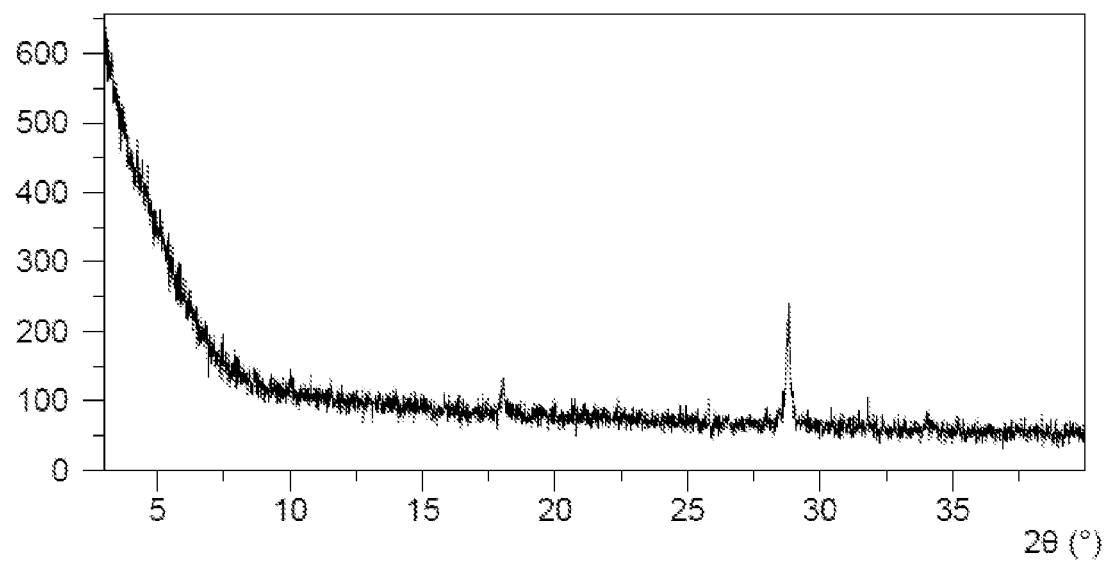
FIG. 1 is the XPRD pattern of the crystalline form I of the fumarate salt of formula 1.

In the following examples, the experimental methods are completed according to conventional conditions or conventional test conditions, and the compounds used in the examples are obtained by commercially available or self-made methods.

Example 1: Preparation of Crystalline Form I of the Fumarate Salt of the Compound of Formula 1

Weigh 208 mg of the compound of formula 1, add 4.2 mL of acetonitrile to prepare an acetonitrile solution, weigh 1.2 mg of fumaric acid into a glass vial, add 0.2 mL of the above-prepared acetonitrile solution, and after stirring the solution for 24 hours, it is observed that the sample is turbid. Continue to stir overnight, centrifuge to obtain a supernatant solution, and slowly evaporate the supernatant at room temperature to obtain the fumarate crystalline form I of the compound of formula 1.

Example 2: Preparation of Crystalline Form II of the Hydrochloride Salt of the Compound of Formula 1

Weigh 212 mg of the compound of formula 1, add 5.2 mL of methanol to prepare a methanol solution, add 6.5 µL of concentrated hydrochloric acid aqueous solution to a glass vial, and add 0.2 mL of the above-prepared methanol solution to obtain a clear solution. The above clear solution was slowly volatilized at room temperature to obtain the crystalline form II of the hydrochloride salt of the compound of formula 1.

Example 3: Preparation of Crystalline Form III of Nicotinate of Formula 1

Weigh 213 mg of the compound of formula 1, add 4.2 mL of acetone/water (19/1, v/v) to prepare an acetone/water (19/1, v/v) solution, weigh 0.9 mg of niacin and add it to a glass vial, add 0.2 mL of the acetone/water (19/1, v/v) solution prepared above. After stirring the solution for 24 hours, it is observed that the sample is clear. Stirring is continued overnight, and the above liquid is slowly volatilized at room temperature to obtain the crystalline form III of nicotinate of formula 1.

Example 4: Preparation of Crystalline Form IV of the Sodium Salt of the Compound of Formula 1

Weigh 212 mg of the compound of formula 1 and add 5.2 mL of methanol to prepare a methanol solution. Weigh 0.54 mg of sodium hydroxide into a glass vial, add 0.2 mL of the methanol solution prepared above, and the solution is clear after stirring for 24 hours. The clear solution is slowly volatilized at room temperature to obtain the crystalline form IV of the sodium salt of the compound of formula 1

Example 5: Preparation of the Crystalline Form V of the Potassium Salt of the Compound of Formula 1

Weigh 208 mg of the compound of formula 1, add 4.2 mL of acetonitrile to prepare the acetonitrile solution of the compound of formula 1, weigh 0.4 mg of potassium hydroxide into a glass vial, add 0.2 mL of the above-prepared acetonitrile solution, and observe after stirring the solution for 24 hours When the solid precipitated, the sample was centrifuged after continuing to stir overnight, and the supernatant was placed at room temperature to slowly volatilize to obtain the crystalline form V of potassium salt of the compound of formula 1.

Example 6: Preparation of Crystalline Form VII of the Compound of Formula 1

Weigh 110 mg of the compound of formula 1, add 5.25 mL of ethyl acetate to prepare the ethyl acetate solution of the compound of formula 1, weigh 1.6 mg of L-malic acid into a glass vial, and add 0.75 mL of the prepared ethyl acetate solution. After the solution was stirred for 3 days, turbidity of the sample was observed, and the above sample was centrifuged to obtain the crystalline form VII of the compound of formula 1.

Example 7: Preparation of Crystalline Forms VIII of the Compound of Formula 1

In order to prepare the above crystalline form of the compound of formula 1, the crystallization process was screened as follows:

(1) Slow Volatilization Test of Compound of Formula 1

The slow volatilization test is carried out by selecting the compound of formula 1 and 8 different solvents or mixed solvents. In the experiment, weigh about 10 mg of the solid compound of formula 1 into a 1 mL glass bottle, add the corresponding solvent to dissolve to obtain a clear solution, then seal with Parafilm™ membrane and pierce 4 small holes with a needle, and place it at room temperature to slowly volatilize and crystallize. After the solid has precipitated, take out the solid to test XRPD (See Table 9).

TABLE 9

| Experiment number | Solvent | temperature | form |
| --- | --- | --- | --- |
| 1 | EtOAc | Room temperature | Amorphous formXIV |
| 2 | acetone | Room temperature | Amorphous XIV |
| 3 | THF | Room temperature | Amorphous XIV |
| 4 | Acetonitrile | Room temperature | Amorphous XIV |
| 5 | DCM | Room temperature | Amorphous XIV |
| 6 | MeOH | Room temperature | Amorphous XIV |
| 7 | THF/H$_2$O (9/1, v/v) | Room temperature | Amorphous XIV |
| 8 | THF/acetone (9/1, v/v), Contains L-tartaric acid * | Room temperature | Amorphous fXIV |

* The molar ratio of compound to tartaric acid is 1:1.

(2) Suspension Stirring Test of Compound of Formula 1

The suspension stirring test selects the compound of formula 1 to be carried out under a variety of different conditions.

In the experiment, approximately 15 mg of the solid compound of formula 1 was weighed and placed in a 1 mL glass vial containing 0.5 mL of solvent, and the suspension was stirred at room temperature and 50° C. for 3 days. If there is precipitation, the solid is obtained after centrifugal separation and tested for XRPD. If there is no precipitation, use a slow volatilization method to precipitate solids (see Table 10).

TABLE 10

| Experiment number | Solvent | temperature | form |
| --- | --- | --- | --- |
| 1 | Heptane | Room temperature/50° C. | Crystal form VIII/Crystal form VIII |
| 2 | IPAc | Room temperature/50° C. | Amorphous XIV/_Amorphous XIV |
| 3 | IPA | Room temperature/50° C. | Amorphous XIV/Crystalline form VIII |
| 4 | EtOH | Room temperature/50° C. | Amorphous XIV/Crystalline form VIII |
| 5 | Butanol | Room temperature/50° C. | Amorphous XIV/Amorphous XIV |
| 6 | EtOAc/Heptane (1/19, v/v) | Room temperature/50° C. | Crystalline form VIII/Crystalline form VIII |
| 7 | EtOAc/IPA (1/19, v/v) | Room temperature/50° C. | Amorphous XIV/Amorphous XIV |
| 8 | Acetone/Heptane(1/19, v/v) | Room temperature/50° C. | Amorphous XIV/Crystalline form VIII |
| 9 | Acetone/IPAc (1/19, v/v) | Room temperature/50° C. | Amorphous XIV/Amorphous XIV |
| 10 | Acetone/EtOH (1/19, v/v) | Room temperature/50° C. | Amorphous XIV/Amorphous XIV |
| 11 | Acetone/H$_2$O (1/19, v/v) | Room temperature/50° C. | Amorphous XIV/Crystal formVIII |
| 12 | THF/Hexane (1/19, v/v) | Room temperature/50° C. | Crystal form VIII/Crystal form VIII |
| 13 | THF/IPAc (1/19, v/v) | Room temperature/50° C. | Amorphous XIV/Amorphous XIV |
| 14 | THF/H$_2$O (1/19, v/v) | Room temperature/50° C. | Amorphous XIV/Amorphous XIV |
| 15 | THF/Butanol (1/19, v/v) | Room temperature/50° C. | Amorphous XIV/Amorphous XIV |
| 16 | Acetonitrile/IPAc (1/19, v/v) | Room temperature/50° C. | Amorphous XIV/Amorphous XIV |
| 17 | Acetonitrile/H$_2$O (1/19, v/v) | Room temperature/50° C. | Amorphous XIV/Crystal formVIII |
| 18 | Acetonitrile/NPA (1/19, v/v) | Room temperature/50° C. | Amorphous XIV/Amorphous XIV |
| 19 | DMSO/IPAc (1/19, v/v) | Room temperature/50° C. | Amorphous XIV/Amorphous XIV |

TABLE 10-continued

| Experiment number | Solvent | temperature | form |
|---|---|---|---|
| 20 | DMSO/EtOH (1/19, v/v) | Room temperature/50° C. | Amorphous XIV/Amorphous XIV |
| 21 | DMSO/H$_2$O (1/19, v/v) | Room temperature/50° C. | Amorphous XIV/Crystal form VIII |
| 22 | MIBK/Heptane (1/19, v/v) | Room temperature/50° C. | Crystal form VIII/Crystal form VIII |
| 23 | MIBK/IPAc (1/19, v/v) | Room temperature/50° C. | Amorphous XIV/Amorphous XIV |
| 24 | MIBK/IPA (1/19, v/v) | Room temperature/50° C. | Amorphous XIV/Amorphous XIV |
| 25 | DCM/Heptane (1/19) | Room temperature/50° C. | Crystal form VIII/Crystal form VIII |
| 26 | DCM/IPAc (1/19) | Room temperature/50° C. | Amorphous XIV/Amorphous XIV |
| 27 | DCM/EtOH (1/19) | Room temperature/50° C. | Amorphous XIV/Amorphous XIV |
| 28 | pH = 1.0 Buffer[a] | Room temperature | Amorphous XIV |
| 29 | pH = 4.0 Buffer[b] | Room temperature | Amorphous XIV |
| 30 | pH = 6.8 Buffer[c] | Room temperature | Amorphous XIV |

[a]Preparation method: Pipette 50 mL of 0.2M potassium chloride solution into a 200-mL volumetric flask, add 134 mL of 0.2M hydrochloric acid solution, and mix well. Add purified water close to the graduation line and adjust the pH to 1.0.
[b]Preparation method: Pipette 50 mL of 0.2M potassium hydrogen phthalate solution into a 200-mL volumetric flask, add 0.1 mL of 0.2M hydrochloric acid solution, and mix well. Add purified water close to the graduation line and adjust the pH to 4.0.
[c]Preparation method: Pipette 25 mL of 0.2M potassium dihydrogen phosphate (KH2PO4) solution and 11.2 mL of 0.2M sodium hydroxide solution into a 100-mL volumetric flask. Add purified water close to the graduation line and adjust the pH to 6.8.

(3) The Reverse Anti-Solvent Addition Test of the Compound of Formula 1

The reverse anti-solvent addition experiment used the compound of formula 1 as the starting material and selected 19 different solvent/anti-solvent systems.

In the experiment, weigh about 15 mg of the compound of formula 1 and add 0.1-1.0 mL of the corresponding solvent to obtain a clear solution. The above solutions were added to 2.0 mL of anti-solvent under magnetic stirring conditions, and stirred at room temperature for 70 hours. If there is precipitation, the solid is obtained after centrifugal separation and tested for XRPD. If there is no precipitation, use a slow volatilization method to precipitate solids (see Table 11).

TABLE 11

| Experiment number | Solvent | Anti-solvent | form |
|---|---|---|---|
| 1 | EtOAc | Heptane | Amorphous XIV |
| 2 | EtOAc | EtOH | Amorphous XIV |
| 3 | acetone | EtOH | Amorphous XIV |
| 4 | acetone | H$_2$O | Amorphous XIV |
| 5 | acetone | IPAc | Amorphous XIV |
| 6 | THF | Heptane | Crystal form VIII |
| 7 | THF | IPA | Amorphous XIV |
| 8 | Acetonitrile | Butanol | Amorphous XIV |
| 9 | Acetonitrile | IPAc | Amorphous XIV |
| 10 | DMSO | IPA | Amorphous XIV |
| 11 | DMSO | IPAc | Amorphous XIV |
| 12 | 1,4-dioxane | Heptane | Amorphous XIV |
| 13 | 1,4-dioxane | IPA | Amorphous XIV |
| 14 | 1,4-dioxane | H$_2$O | Amorphous XIV |
| 15 | MIBK | EtOH | Amorphous XIV |
| 16 | DCM | Heptane | Amorphous XIV |
| 17 | DCM | IPAc | Amorphous XIV |
| 18 | DMF | H$_2$O | Amorphous XIV |
| 19 | DMF | NPA | Amorphous XIV |

(4) Slow Cooling Test of Compound of Formula 1

The slow cooling test used the compound of formula 1 as the starting material, and a total of 9 different solvents or mixed solvents were selected. In the experiment, weigh about 15 mg of the compound of formula 1 into a 1 mL glass vial, and then add 0.6 mL of the corresponding solvent. All the obtained suspensions were placed in a 50° C. thermostat to equilibrate for 30 minutes. If the sample was dissolved, the solids were added continuously until a suspension at that temperature was obtained. Filter all the suspension with a syringe (filter membrane pore size is 0.45 µm), place the filtered clear filtrate in a 50° C. thermostat, and cool to 5° C. at a rate of 0.1° C./min. If there is precipitation, centrifuge to obtain a solid and test for XRPD. If there is no precipitation, use a slow volatilization method to precipitate solids (see Table 12).

TABLE 12

| Experiment number | Solvent | Form |
|---|---|---|
| 1 | MeOH | Amorphous XIV |
| 2 | EtOAc/Heptane (1/4, v/v) | Oily |
| 3 | Acetonitrile/IPA (1/4, v/v) | Amorphous XIV |
| 4 | MIBK/Hexane (1/4, v/v) | Oily |
| 5 | acetone/H2O (1/4, v/v) | Oily |
| 6 | THF/EtOH (1/4, v/v) | Amorphous XIV |
| 7 | DCM/IPAc (1/4, v/v) | Oily |
| 8 | 1,4-Dioxane/EtOH (1/4, v/v) | Amorphous XIV |
| 9 | DMF/IPA (1/4, v/v) | Oily |

(5) Gas Phase Permeation Test of Compound of Formula 1

The gas-phase permeation test uses the compound of formula 1 as the starting material, and a total of 2 different solvent/antisolvent systems are selected. In the experiment, weigh about 10 mg of the compound of formula 1 into a 3 mL glass vial, and add a solvent to dissolve it until it is clear. Take 3 mL of anti-solvent into a 20-mL glass bottle, put the 3 mL glass vial containing the sample solution into the 20 mL glass bottle, and close the bottle cap tightly. Observe the phenomenon after standing for one week. If there is a solid precipitation, the solid is obtained after centrifugal separation and XRPD test is performed. If there is no precipitation, use a slow volatilization method to precipitate solids. The results in Table 13 show that only Amorphous was obtained in the test.

TABLE 13

| Experiment number | Solvent | Anti-solvent | Form |
|---|---|---|---|
| 1 | 1,4-Dioxane | Heptane | Amorphous XIV |
| 2 | DCM | IPAc | Amorphous XIV |

(6) Gas-Solid Permeability Test of Compound of Formula 1

The gas-solid permeation test used the compound of formula 1 as the starting material, and a total of 3 different solvents were selected. In the experiment, weigh about 10 mg of the compound of formula 1 into a 3 mL glass vial, take 2 mL of the corresponding solvent into a 20 mL glass bottle, then put the 3 mL glass vial containing the sample into the 20 mL glass bottle, and close the bottle cap tightly. After standing for one week, observe the phenomenon, if there is solid, take it out for XRPD test. If the solid has been completely dissolved, the solid will be precipitated out using a slow volatilization method. The results in Table 14 show that only amorphous was obtained in the test.

TABLE 14

| Experiment number | Solvent | Form |
|---|---|---|
| 1 | MeOH | Amorphous XIV |
| 2 | EtOAc | Amorphous XIV |
| 3 | Acetonitrile | Amorphous XIV |

The preparation methods of the crystalline forms VIII of the compound of formula 1 obtained through the above-mentioned crystal form screening experiment are as follows:

The crystalline form VIII of the compound of formula 1: Weigh 196 mg of the compound of formula 1, add 8 mL of tetrahydrofuran/n-hexane (1/19, v/v) mixed solvent, stir at 800 rpm at 50° C. for 48 hours, then centrifuge to obtain the crystalline form VIII of the compound of formula 1

Example 8: Optimization and Preparation Method of the Crystalline Form VI of the Compound of Formula 1

The crystalline form VI was found during the salt formation screening with fumaric acid, so the preparation method of the crystalline form VI of the compound of formula 1 is as follows:

The compound of formula 1 (15 mg) and fumaric acid (1.37 mg) at a molar ratio of 1:1 were suspended and stirred in 0.5 mL of methanol at room temperature to obtain the crystalline form VI of the compound of formula 1.

But the residual fumaric acid in the obtained crystalline form VI sample is difficult to remove, which affects the purity of the crystalline form VI. Therefore, this Example optimizes the preparation method of crystalline form VI. Table 15 is a summary of optimization experiments on the preparation method of crystalline form VI.

First of all, the method of adding anti-solvent is used instead of suspension stirring to realize the possibility of solid precipitation from a clear solution. Secondly, compared with methanol, acetone can dissolve the compound of formula 1 well without wall hanging, so the solvent containing acetone is selected as the positive solvent. In addition, it can be seen from the test results in Table 15 that the crystalline form VI can only be obtained in a solvent system containing methanol, and fumaric acid may not be added. Therefore, considering the simplicity of operation, the anti-solvent methanol was added dropwise to the acetone solution of the free base of the compound of formula 1 as an optimized method for preparing the crystalline form VI. Specifically, 100 mg of the compound of formula 1 was weighed and dissolved in 1.0 mL of acetone, and 5.0 mL of methanol was added dropwise under magnetic stirring (1000 rpm), stirred at room temperature for 48 hours, and centrifuged to obtain the crystalline form VI of compound of formula 1.

TABLE 15

| Experiment number | Solvent | Anti-solvent | Whether to add fumaric acid | Form |
|---|---|---|---|---|
| 1 | acetone | MeOH | yes | Crystal form VI |
| 2 | acetone | MeOH | No | Crystal form VI |
| 3 | acetone | Heptane | yes | Amorphous XIV |
| 4 | acetone | Heptane | No | Amorphous XIV |
| 5 | acetone/MeOH (1:1, v/v) | Heptane | yes | Crystal form VI |
| 6 | acetone/MeOH (1:1, v/v) | Heptane | No | Crystal form VI |

Example 9: Investigation on the Physicochemical Stability of the Crystalline Form VI of the Compound of Formula 1

After placing the crystalline form VI of formula 1 at 25° C./60% RH and 40° C./75% RH for one week, the purity and crystal form did not change significantly (See table 16), indicating that the crystalline form VI The physical and chemical properties are stable when stored for one week under the conditions of 25° C./60% RH and 40° C./75% RH.

TABLE 16

| | Crystal form VI (one week) | |
|---|---|---|
| Condition | HPLC purity (Peak area %) | Solid crystal form |
| Initial sample | 99.02 | Crystal form VI |
| 25° C./60% RH | 99.01 | Crystal form VI |
| 40° C./75% RH | 99.06 | Crystal form VI |

Example 10: Preparation of Amorphous Form IX of Adipate Compound of Formula 1

Weigh 195 mg of the compound of formula 1 and 22.6 mg of adipic acid, and add 2 mL of tetrahydrofuran/water (19/1, v/v). The above sample was stirred at room temperature for 3 days, and then centrifuged to separate solid and liquid. The supernatant was taken out and added with 2 mL of n-heptane for addition of the anti-solvent, and precipitated to obtain the Amorphous Form IX of the adipate compound of Formula 1

Example 11: Preparation of Amorphous Form X of Fumarate Compound of Formula 1

Weigh 21.0 mg of the compound of formula 1 and 1.6 mg of fumaric acid, add 0.2 mL of acetonitrile, stir the above sample at 5° C. for 2 days, then place it at −20° C. for 2 days, and precipitate to obtain the Amorphous Form X of Fumarate Compound of Formula 1

Example 12: Preparation of Amorphous Form XI of Nicotinate Compound of Formula 1

Weigh 209 mg of the compound of formula 1, add 4.2 mL of tetrahydrofuran/water (19/1, v/v) to prepare a tetrahydrofuran/water (19/1, v/v) solution, weigh 0.84 mg of niacin and add it to a glass vial, add 0.2 mL of the above-prepared tetrahydrofuran/water (19/1, v/v) solution. After stirring the solution for 24 hours, the sample is observed to be clear. Continue stirring overnight, and slowly evaporate the above liquid at room temperature to obtain the Amorphous Form XI of Nicotinate Compound of Formula 1.

Example 13: Preparation of Amorphous Form XII of the Potassium Salt of the Compound of Formula 1

Weigh 19.6 mg of the compound of formula 1, add 1.1 mg of potassium hydroxide and 0.2 mL of acetonitrile, stir the above sample at 5° C. for 2 days, then place it at −20° C. for 2 days, and precipitate to obtain the Amorphous form XII of the potassium salt of the compound of formula 1.

Example 14: Preparation of Amorphous Form XIII of Sodium Salt of the Compound of Formula 1

Weigh 19.8 mg of the compound of formula 1, add 0.8 mg sodium hydroxide and 0.2 mL acetonitrile. After stirring the above sample at 5° C. for 2 days, it was placed at −20° C. and allowed to stand for 2 days. The solid precipitated out to obtain the sodium salt Amorphous form XIII of the compound of formula 1.

Example 15: Preparation of Amorphous Form XIV of Compound of Formula 1

Weigh about 15 mg of the compound of formula 1, and add 0.1-1.0 mL of EtOAc to obtain a clear solution. The above solution was added to 2.0 mL of heptane under magnetic stirring, and stirred at room temperature for 70 hours. The precipitate is separated by centrifugation, and the Amorphous form XIV of the compound of formula 1 is obtained.

Example 16: Hygroscopicity Test of the Amorphous Form XIV of the Compound of Formula 1 (DVS)

Take about 10 mg of the Amorphous form XIV sample of the compound of formula I for dynamic water adsorption (DVS) test. The conclusions are described in Table 17 below:

TABLE 17

| Name | Moisture gain (80% RH) |
| --- | --- |
| Amorphous XIV | 4.83% (Hygroscopic) |

The above results indicate that Amorphous samples easily absorb water during storage and need to be kept tightly closed.

Example 17: Stability Test of the Amorphous Form XIV of the Compound of Formula 1

Pack the amorphous sample with nitrogen, shading, and moisture-proof, and place it under 40° C., high humidity 92.5% RH, light conditions, and take samples at 0 days/5 days/10 days to investigate its content, related substances and crystal forms (light conditions: total illuminance≥1.2× 106 Lux·hr, near ultraviolet energy≥200 w·hr/m2). The results are shown in Table 18.

TABLE 18

| Condition | Content(%) | Total impurities(%) |
| --- | --- | --- |
| 0 Days | 99.5 | 0.39 |
| 5 Days-high humidity | 100.7 | 0.37 |
| 5 Days-light | 100.4 | 0.43 |
| 5 Days-40° C. | 100.3 | 0.59 |
| 10 Days-high humidity | 99.7 | 0.39 |
| 10 Days-light | 100.1 | 0.41 |
| 10 Days-40° C. | 99.7 | 0.64 |

The results show that the amorphous sample is packed with nitrogen, shading, and moisture-proof, and is stable under high humidity and light conditions; but it is sensitive to heat and needs to be stored at low temperature and protected from light.

Example 18: Polymorphic Screening Test of the Potassium Salt of the Compound of Formula 1

Weigh about 50 mg of the potassium salt amorphous form XII into a 4 mL glass bottle, and gradually add 0.4 mL of a single or mixed solvent (see Table 19) to prepare a suspension sample in the glass bottle, and add the magnets at 40° C. After stirring for 3 days, it was centrifuged, and the remaining solid was dried in a vacuum drying oven at 25° C.

TABLE 19

| Experiment Number | Solvent | Form |
| --- | --- | --- |
| — | Initial form | Amorphous XII |
| 1 | Methanol | Basically Amorphous XII |
| 2 | Ethanol | Amorphous XII |
| 3 | Acetonitrile | Amorphous XII |
| 4 | Acetone | Amorphous XII |
| 5 | Ethyl acetate | Amorphous XII |
| 6 | Tetrahydrofuran | Oily |
| 7 | n-Heptane | Amorphous XII |
| 8 | 1,4-Dioxane | Amorphous XII |
| 9 | Water | Amorphous XII |
| 10 | Methanol:Water 3:1(v:v) | Amorphous XII |
| 11 | Ethanol:Water 3:1(v:v) | Amorphous XII |
| 12 | Acetonitrile:Water 1:1(v:v) | Amorphous XII |
| 13 | Acetone:Water 1:2(v:v) | Amorphous XII |

Example 19: Polymorph Screening Test of the Sodium Salt of the Compound of Formula 1

Weigh about 50 mg of the sodium salt amorphous form XIII into a 4 mL glass bottle, and gradually add 0.4 mL of a single or mixed solvent (see Table 20) to prepare a suspension sample in the glass bottle. After adding the magnet, it is heated at 40° C. After stirring for 3 days, it was centrifuged, and the remaining solid was dried in a vacuum drying oven at 25° C.

TABLE 20

| Experiment Number | Solvent | Form |
|---|---|---|
| — | Initial form | Amorphous XIII |
| 1 | Methanol | Basically Amorphous XIII |
| 2 | Ethanol | Amorphous XIII |
| 3 | Acetonitrile | Amorphous XIII |
| 4 | Acetone | Oily |
| 5 | Ethyl acetate | Amorphous XIII |
| 6 | Tetrahydrofuran | Oily |
| 7 | n-Heptane | Amorphous XIII |
| 8 | 1,4-Dioxane | Oily |
| 9 | Water | Amorphous XIII |
| 10 | Methanol:Water 3:1(v:v) | Amorphous XIII |
| 11 | Ethanol:Water 3:1(v:v) | Amorphous XIII |
| 12 | Acetonitrile:Water 1:1(v:v) | Amorphous XIII |

Example 20: Preparation of the Amorphous Form XV of the Maleate Salt of the Compound of Formula 1

Weigh 19.2 g of the compound of formula 1 and place it in a 40 mL glass bottle, add 30 mL of acetone for ultrasonic solubilization, add a magnet and stir on a stirrer, then add 19.2 g of maleic acid. After stirring overnight at room temperature, it becomes slightly turbid. After adding 20 mL of n-hexane, a precipitate was precipitated. After stirring overnight, the amorphous form XV of the maleate salt of the compound of formula 1 was obtained after centrifugal separation.

Example 21: Polymorphic Screening Test of Maleate Compound of Formula 1

Weigh about 50 mg of the maleate amorphous form XV into a 4 mL glass bottle, and gradually add 0.4 mL of a single or mixed solvent (see Table 21) to prepare a suspension sample in the glass bottle. After adding the magnet after stirring for 3 days at 40° C., it was centrifuged, and the remaining solid was placed in a vacuum drying oven at 25° C. to dry.

TABLE 21

| Experiment Number | Solvent | Form |
|---|---|---|
| — | Initial form | Amorphous XV |
| 1 | Methanol | Crystal form VI |
| 2 | Ethanol | Amorphous XV |
| 3 | Acetonitrile | Amorphous XV |
| 4 | Acetone | Oily |
| 5 | Ethyl acetate | Amorphous XV |
| 6 | Tetrahydrofuran | Mixed with maleic acid |
| 7 | n-Heptane | Amorphous XV |
| 8 | 1,4-Dioxane | Mixed with maleic acid |
| 9 | Water | Amorphous XV |
| 10 | Methanol:Water 3:1(v:v) | Amorphous XV |
| 11 | Ethanol:Water 3:1(v:v) | Amorphous XV |
| 12 | Acetonitrile:Water 1:1(v:v) | Amorphous XV |
| 13 | Acetone:Water 1:2(v:v) | Amorphous XV |

Example 22: Preparation of the Amorphous Form XVI of the Meglumine Salt of the Compound of Formula 1

Weigh 19.2 g of the compound of formula 1 and place it in a 40 mL glass bottle, add 30 mL of acetone for ultrasonic solubilization, add a magnet and stir on a stirrer, and then add 19.2 g of meglumine. After stirring overnight at room temperature, it becomes slightly turbid. After adding 30 mL of n-hexane, a precipitate was precipitated. After stirring overnight, the amorphous form XVI of the meglumine salt of the compound of formula 1 was obtained after centrifugal separation.

Example 23: Polymorph Screening Test of Meglumine Salt of the Compound of Formula 1

(1) Weigh about 50 mg of the amorphous form of meglumine salt XVI in a 4 mL glass bottle, and gradually add 0.4 mL of single or mixed solvent (see Table 22) to prepare a suspension sample in the glass bottle, and add magnet After the seeds were stirred at 40° C. for 3 days and then centrifuged, the remaining solid was placed in a vacuum drying oven at 25° C. to dry.

TABLE 22

| Experiment Number | Solvent | Form |
|---|---|---|
| — | Initial form | Amorphous XVI |
| 1 | Methanol | Amorphous XVI |
| 2 | Ethanol | Amorphous XVI |
| 3 | Acetonitrile | Amorphous XVI |
| 4 | Acetone | Oily |
| 5 | Ethyl acetate | Oily |
| 6 | Tetrahydrofuran | Oily |
| 7 | n-Heptane | Amorphous XVI |
| 8 | 1,4-Dioxane | Oily |
| 9 | Water | Amorphous XVI |
| 10 | Methanol:Water 3:1(v:v) | Amorphous XVI |
| 11 | Ethanol:Water 3:1(v:v) | Amorphous XVI |
| 12 | Acetonitrile:Water 1:1(v:v) | Amorphous XVI |
| 13 | Acetone:Water 1:2(v:v) | Amorphous XVI |

(2) Weigh about 50 mg of meglumine salt amorphous form XVI in a 1.5 mL glass bottle, and gradually add 0.3 mL of single or mixed solvent (see Table 23) to prepare a suspension sample in the glass bottle, and add magnet After the seeds were stirred at room temperature for 3 days and then centrifuged, the remaining solid was placed in a vacuum drying oven at 25° C. to dry.

TABLE 23

| Experiment Number | Solvent | Form |
|---|---|---|
| — | Initial form | Amorphous XVI |
| 1 | Isopropanol | Amorphous XVI |
| 2 | N-Butanol | Amorphous XVI |
| 3 | Isopropyl acetate | Amorphous XVI |
| 4 | Methyl tert-butyl ether | Amorphous XVI |
| 5 | N-heptane | Basically Amorphous XVI |
| 6 | Cyclohexane | Amorphous XVI |
| 7 | N-heptane-ethanol (1:1, v:v) | Amorphous XVI |
| 8 | N-heptane-ethyl acetate (1:1, v:v) | Amorphous XVI |
| 9 | N-heptane-tetrahydrofuran (9:1, v:v) | Basically Amorphous XVI |
| 10 | N-Heptane-Acetone (9:1, v:v) | Amorphous XVI |
| 11 | N-heptane-dichloromethane (9:1, v:v) | Basically Amorphous XVI |
| 12 | Cyclohexane-methanol (9:1, v:v) | Amorphous XVI |
| 13 | Cyclohexane-acetonitrile (1:1, v:v) | Amorphous XVI |
| 14 | Cyclohexane-N-methylpyrrolidone (9:1, v:v) | Amorphous XVI |

TABLE 23-continued

| Experiment Number | Solvent | Form |
|---|---|---|
| 15 | Cyclohexane-1,4-dioxane (9:1, v:v) | Amorphous XVI |

(3) Weigh about 30 mg of meglumine salt amorphous form XVI in a 1.5 mL glass bottle, gradually add the corresponding solvent (see Table 24) to dissolve it, and then filter it with a 0.22 μm organic filter membrane into a rinsed glass bottle, seal it with aluminum foil paper, pierce the hole, and place it at room temperature to evaporate slowly.

TABLE 24

| Experiment Number | Solvent | Form |
|---|---|---|
| — | Initial form | Amorphous XVI |
| 1 | Methanol/2 mL | Amorphous XVI |
| 2 | Acetone/2 mL | Amorphous XVI |
| 3 | Dichloromethane/2 mL | Amorphous XVI |
| 4 | Tetrahydrofuran/2 mL | Amorphous XVI |
| 5 | 2-methyltetrahydrofuran/4 mL | Amorphous XVI |

(4) Weigh about 30 mg of meglumine salt amorphous form XVI in an 8 mL glass bottle, first add a good solvent (see Table 25) to dissolve it, and then gradually add 5 mL of anti-solvent n-heptane to obtain a suspension After centrifugation, the residual solid of the sample was dried in a vacuum drying oven at 25° C.

TABLE 25

| Number | Solvent | Form |
|---|---|---|
| 1 | Dichloromethane/0.2 mL | Amorphous XVI |
| 2 | Methanol/0.3 mL | Amorphous XVI |
| 3 | Tetrahydrofuran/0.2 mL | Amorphous XVI |
| 4 | 2-methyltetrahydrofuran/0.5 mL | Amorphous XVI |
| 5 | Dimethyl sulfoxide/0.2 mL | Amorphous XVI |
| 6 | N-methylpyrrolidone/0.2 mL | Amorphous XVI |

Example 24: Stability Test of Salt Form Screening

Take an appropriate amount of the compound into an 8 mL glass bottle, and then place it at room temperature (25° C., open), high humidity (room temperature/75% RH, open) and light (room temperature, white light: 6980 lux, UV 282 μW/cm2). Take samples for testing on the 5th, 10th, and 30th day (HPLC, XRPD).

TABLE 26

| Test conditions | Time | Total impurities (%) | | | |
|---|---|---|---|---|---|
| | | Amorphous form XII of potassium salt | Amorphous form XIII of sodium salt | Amorphous form XV of maleate salt | Amorphous form XVI of meglumine salt |
| Initial | 0 Days | 1.40 | 1.65 | 0.73 | 0.83 |
| 25° C. | 5 Days | 1.63 | 1.89 | 0.79 | 0.95 |
| R.T./75% RH | | 2.25 | 2.45 | 1.59 | 1.36 |
| Light | | 2.09 | 2.20 | 1.33 | 1.33 |
| 25° C. | 10 Days | 1.58 | 1.94 | 0.89 | 0.89 |
| R.T./75% RH | | 2.98 | 3.08 | 2.59 | 1.86 |
| Light | | 2.69 | 3.55 | 1.94 | 1.74 |
| 25° C. | 30 Days | 1.86 | 2.29 | 1.23 | 0.88 |
| R.T./75% RH | | 6.11 | 6.31 | 7.00 | 4.95 |

The results showed that the XRPD of the salt form was unchanged under the above conditions.

Example 25: Identification and Characterization of Compound Form I-XVI of Formula 1

The instruments used and their parameters are as follows:
1. XPRD—X-Ray Powder Diffraction

| X Rays Cu, Kα, | Cu, kα, Kα1 (Å): 1.540598, Kα2 (Å): 1.544426 Kα2/Kα1 Intensity ratio: 0.50 |
| X-ray tube setting | 45 kV, 40 mA |
| Divergent slit | automatic |
| Scan mode | continuous |
| Scan range (°2Theta) | 3°-40° |
| Scan step (°2Theta) | 0.013 |
| Scan rate (°/min) | about 10 |

Figure 2:
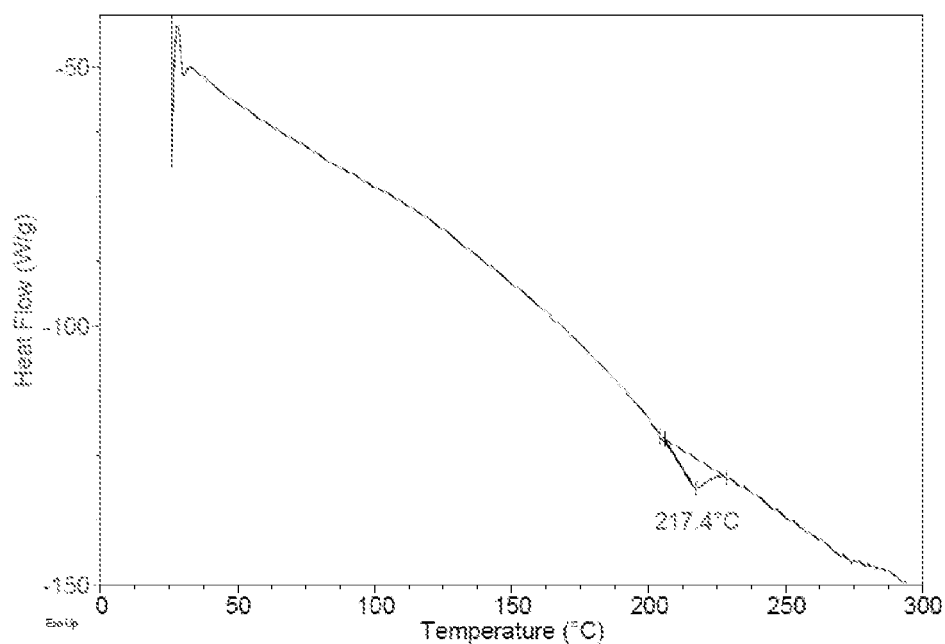
FIG. 2 is the MDSC chart of the crystalline form I of the fumarate salt of formula 1.
Figure 3:
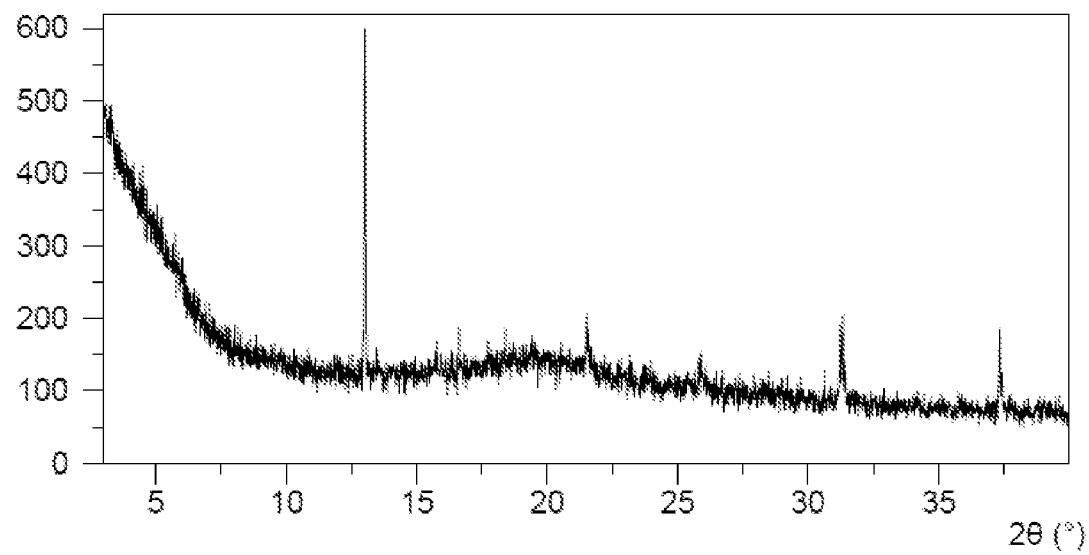
FIG. 3 is the XPRD pattern of the crystalline form II of the hydrochloride salt of formula 1.
Figure 4:
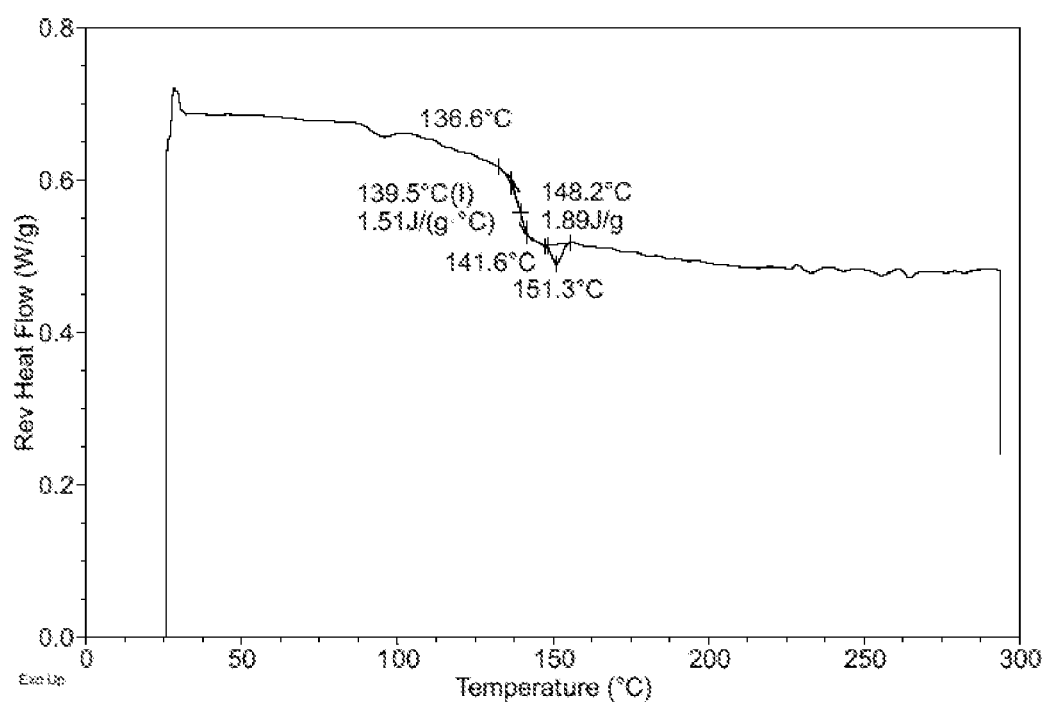
FIG. 4 is the MDSC chart of the crystalline form II of the hydrochloride salt of formula 1.
Figure 5:
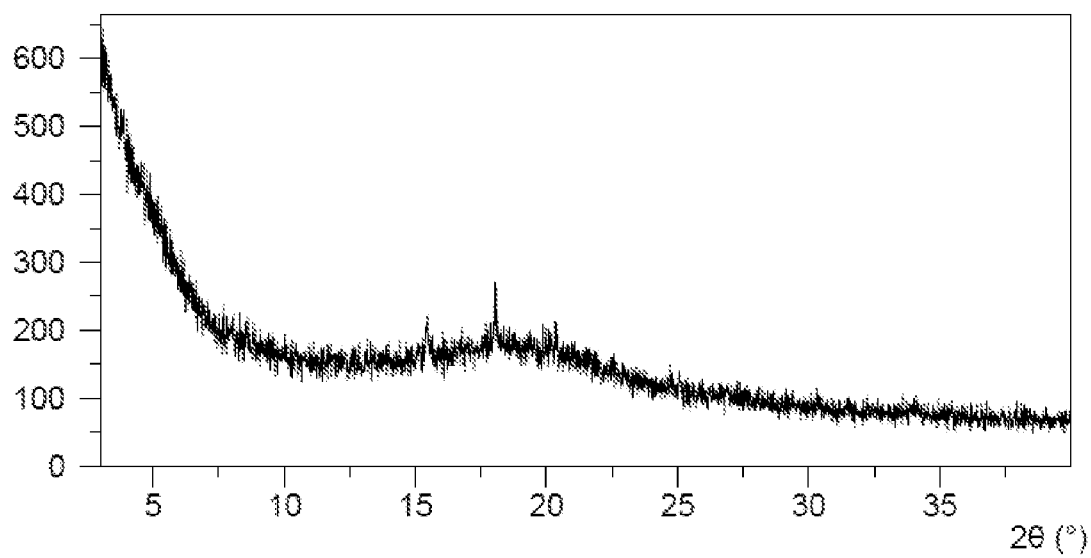
FIG. 5 is the XPRD pattern of the crystalline form III of the Nicotinate of formula 1.
Figure 6:
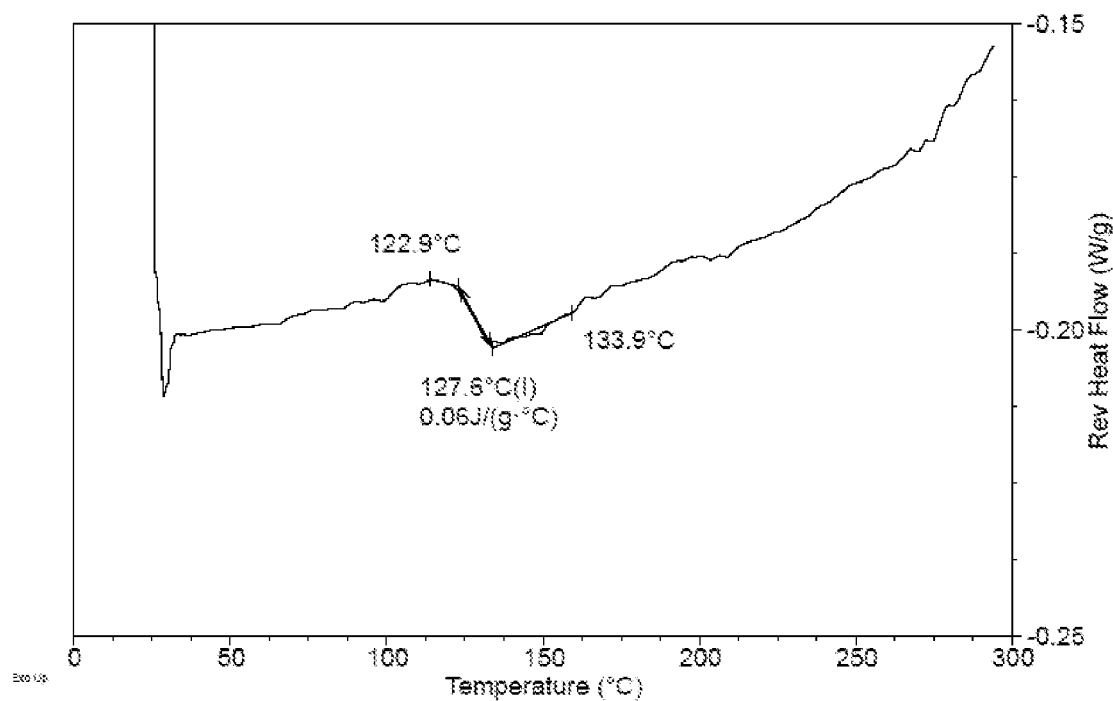
FIG. 6 is the MDSC chart of the crystalline form III of the Nicotinate of formula 1.
Figure 7:
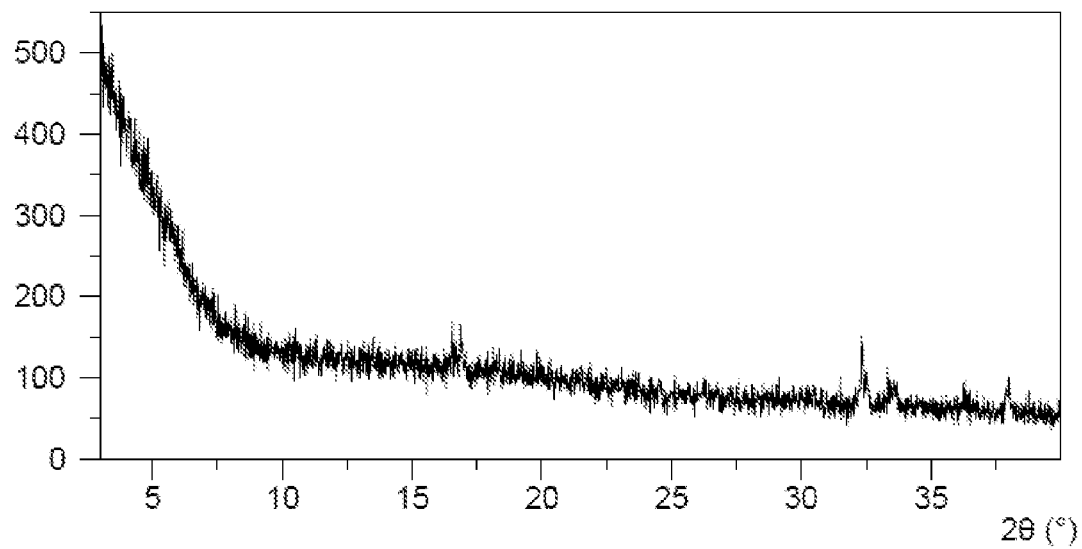
FIG. 7 is the XPRD pattern of the crystalline form IV of the sodium salt of formula 1.
Figure 8:
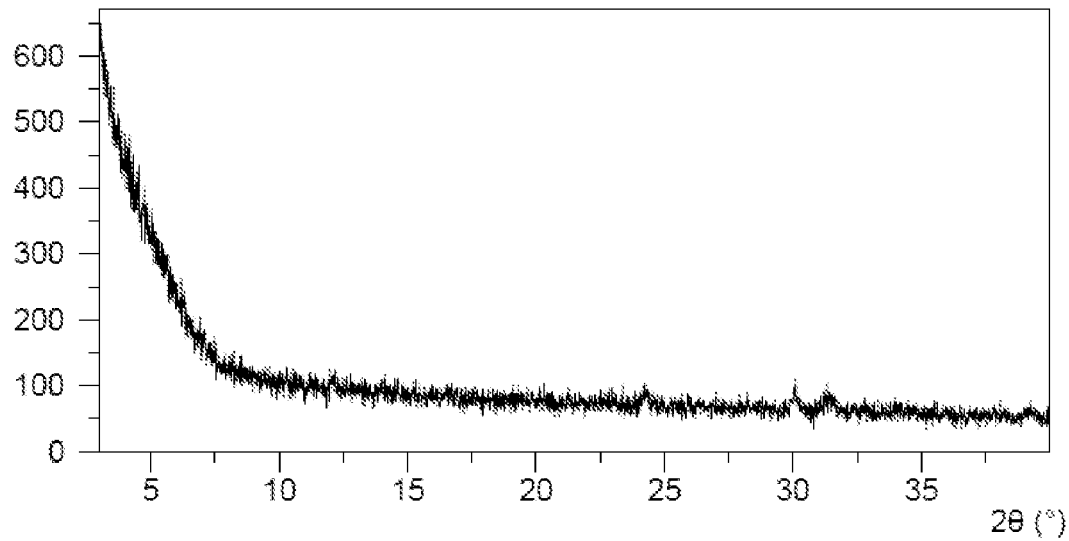
FIG. 8 is the XPRD pattern of the crystalline form V of the potassium salt of formula 1.
Figure 9:
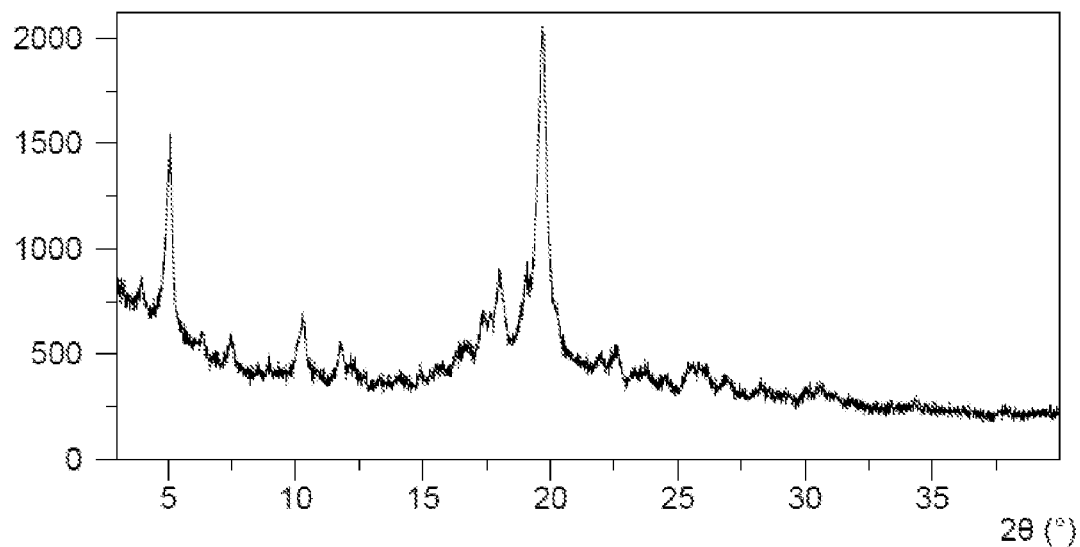
FIG. 9 is the XPRD pattern of the crystalline form VI of formula 1.
Figure 10:
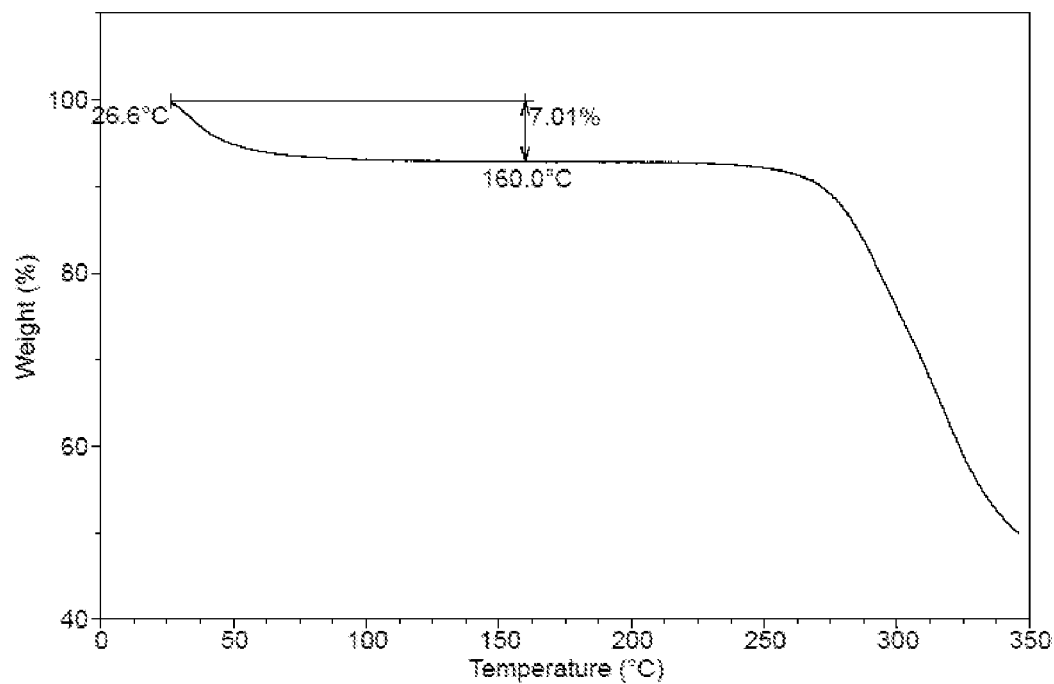
FIG. 10 is the TGA diagram of the crystalline form VI of formula 1.
Figure 11:
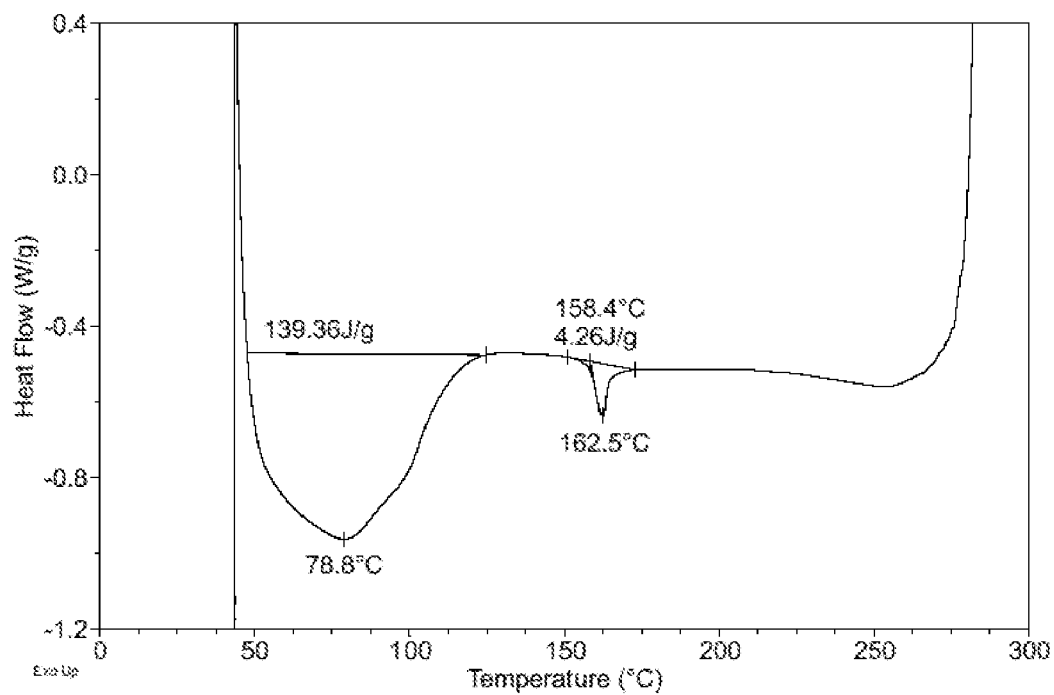
FIG. 11 is a DSC chart of the crystalline form VI of formula 1.
Figure 12:
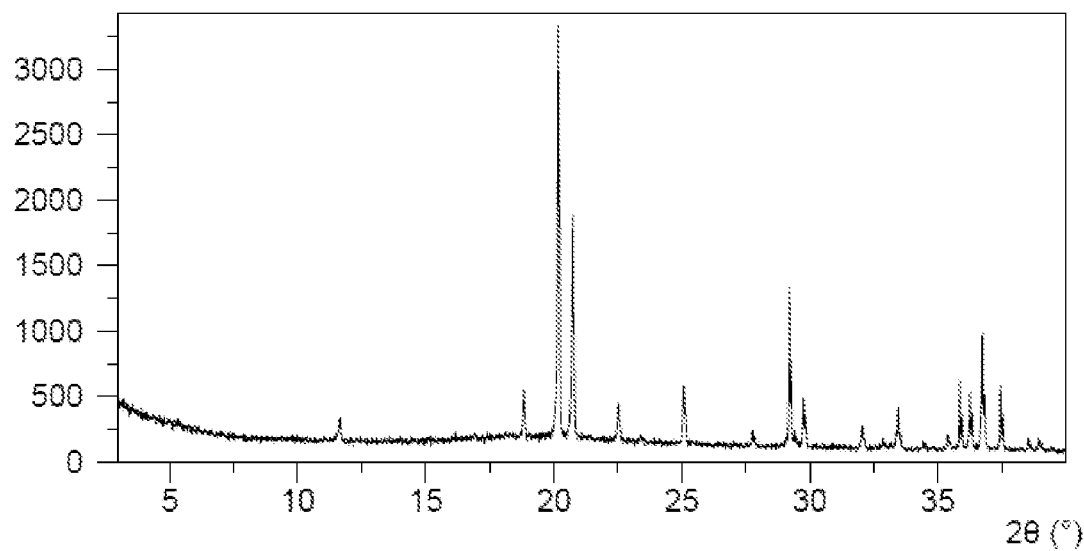
FIG. 12 is the XPRD pattern of the crystalline form VII of formula 1.
Figure 13:
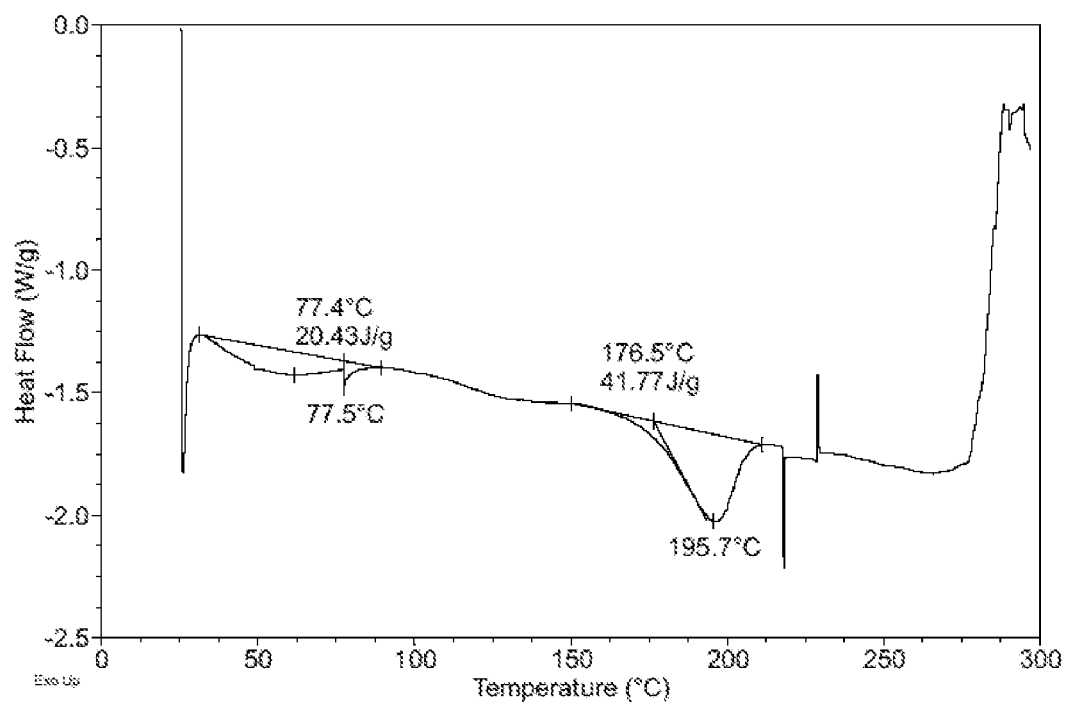
FIG. 13 is a DSC chart of the crystalline form VII of formula 1.
Figure 14:
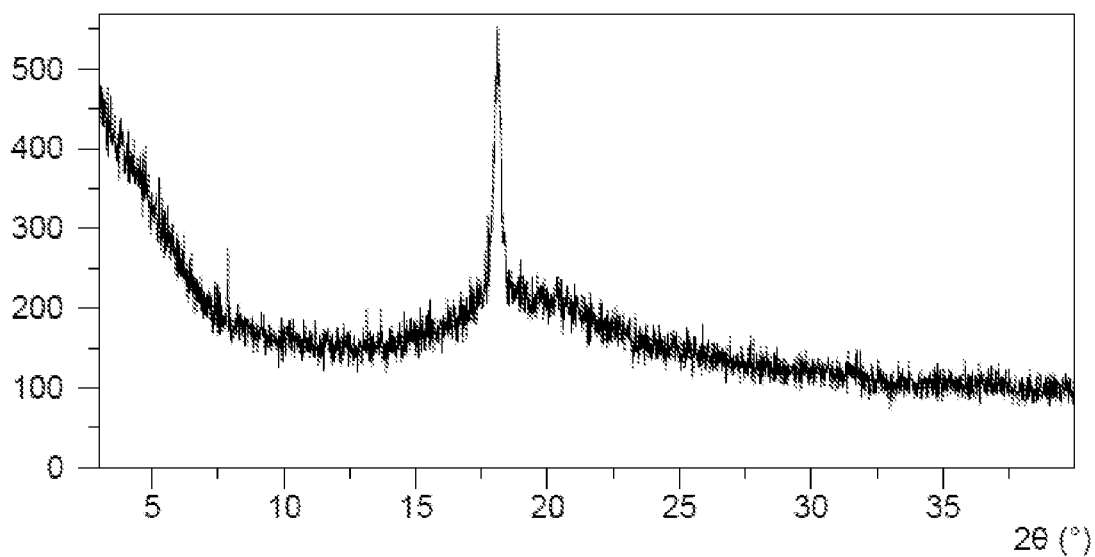
FIG. 14 is the XPRD pattern of the crystalline form VIII of formula 1.
Figure 15:
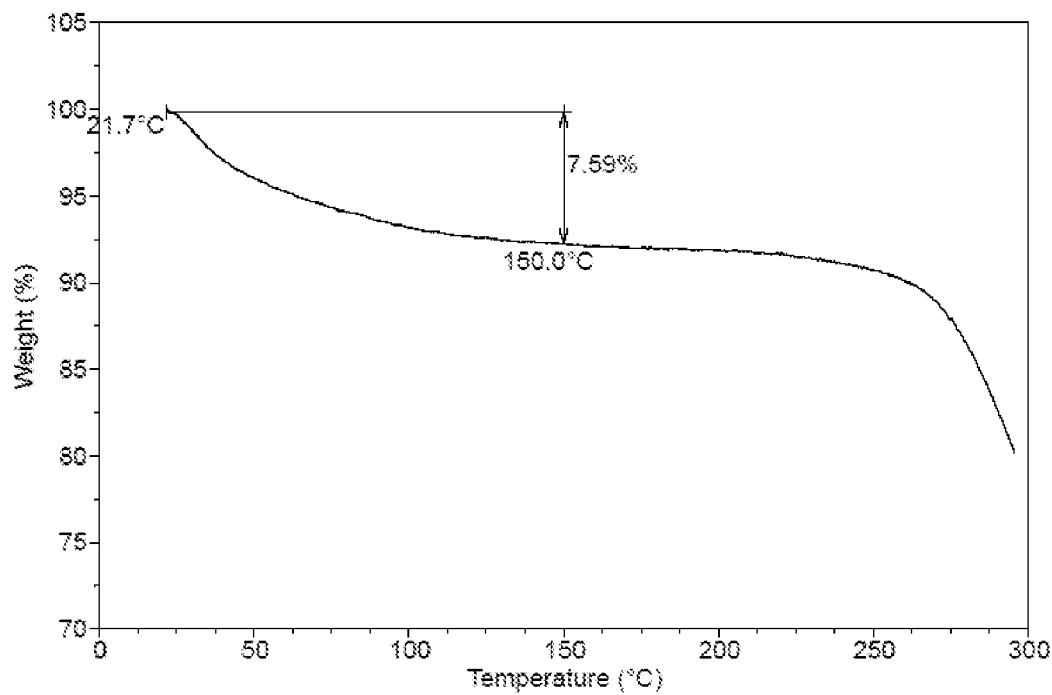
FIG. 15 is the TGA diagram of the crystalline form VIII of formula 1.
Figure 16:
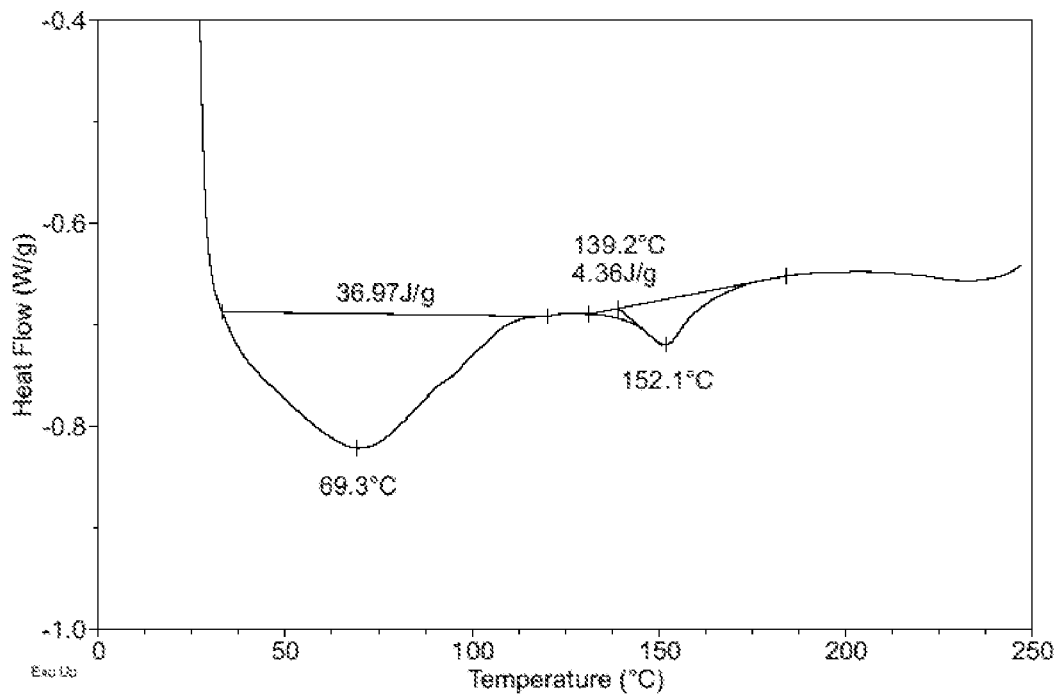
FIG. 16 is a DSC chart of the crystalline form VIII of formula 1.
Figure 17:
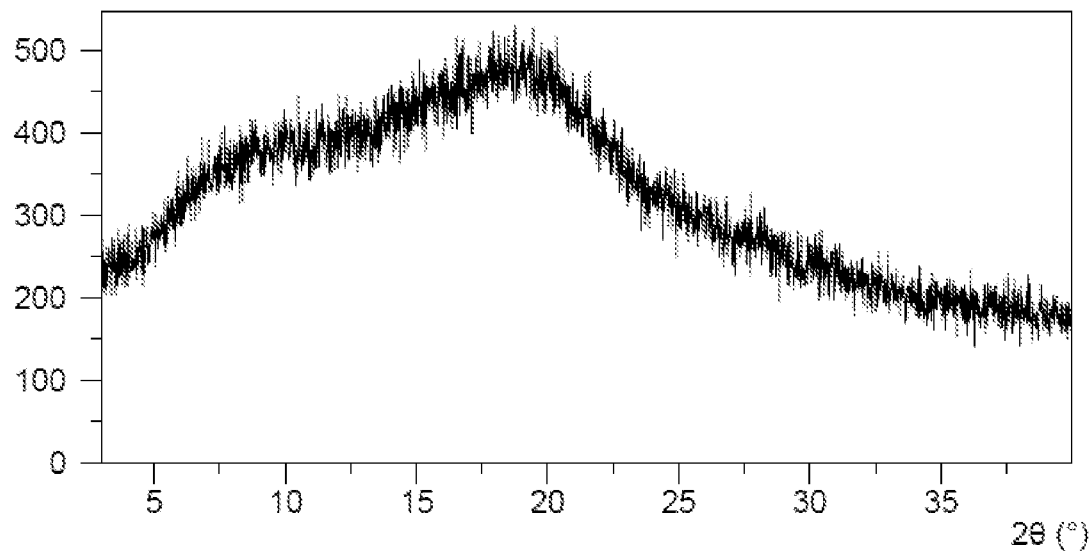
FIG. 17 is the XPRD pattern of the amorphous form IX of the adipate salt of formula 1.
Figure 18:
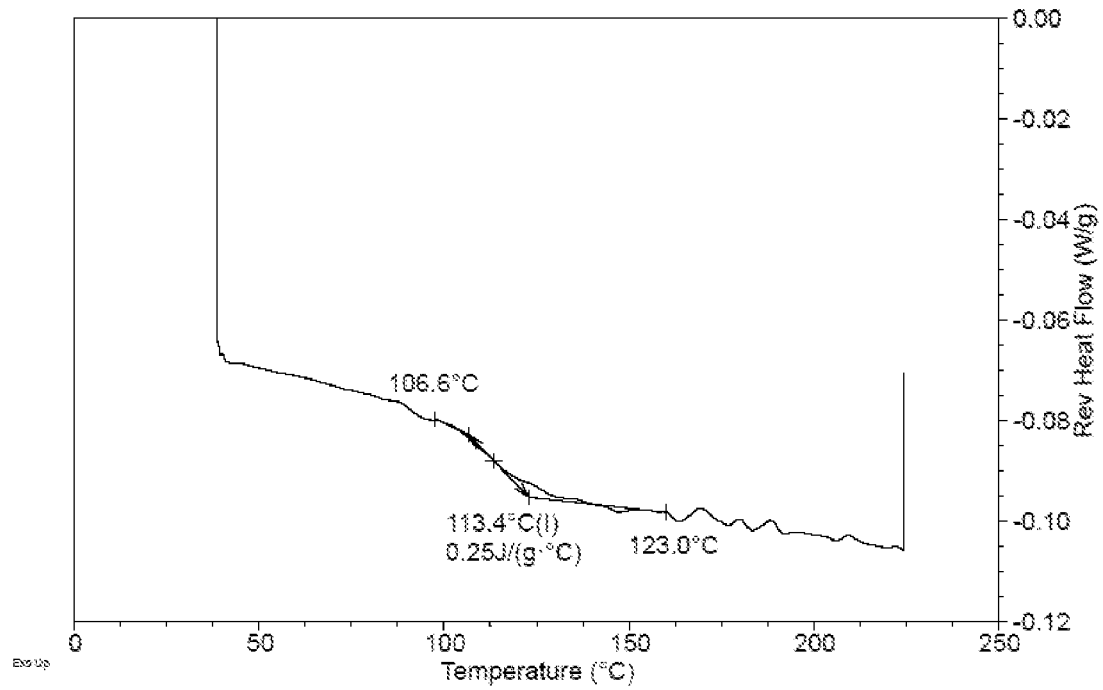
FIG. 18 is the MDSC chart of the amorphous form IX of the adipate salt of formula 1.
Figure 19:
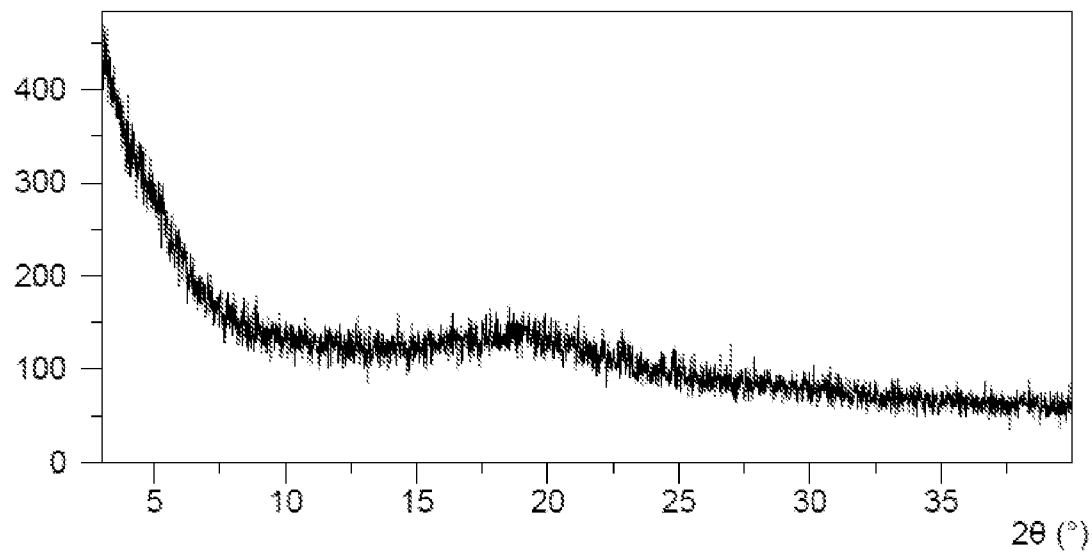
FIG. 19 is the XPRD pattern of the fumarate amorphous form X of formula 1.
Figure 20:
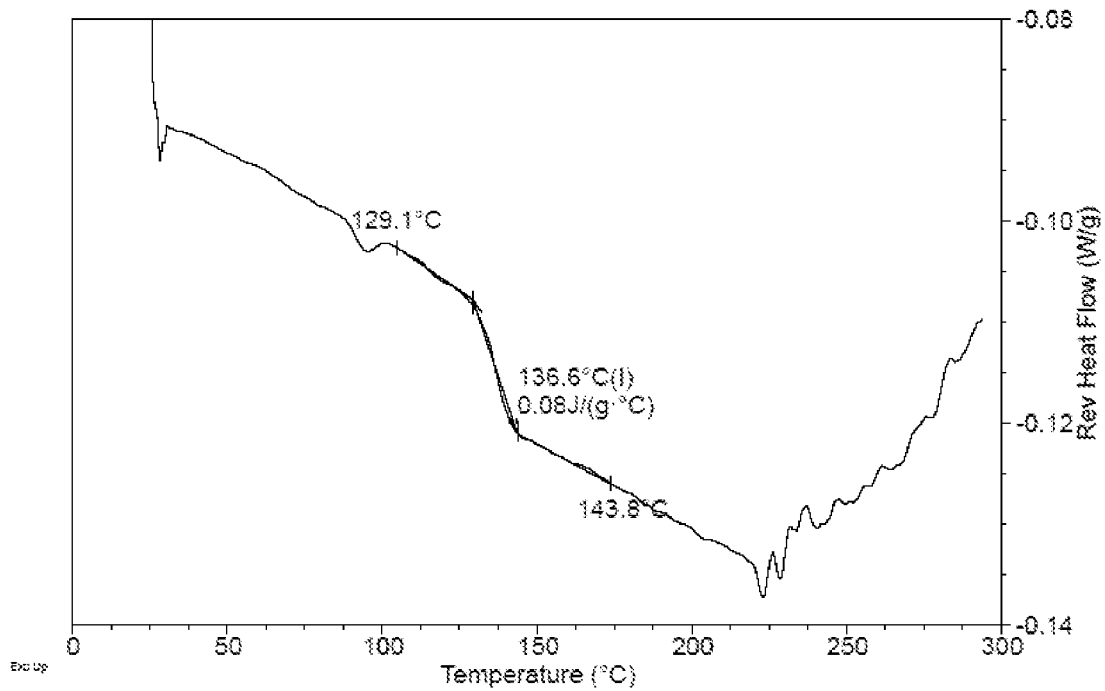
FIG. 20 is the MDSC chart of the fumarate amorphous form X of formula I.
Figure 21:
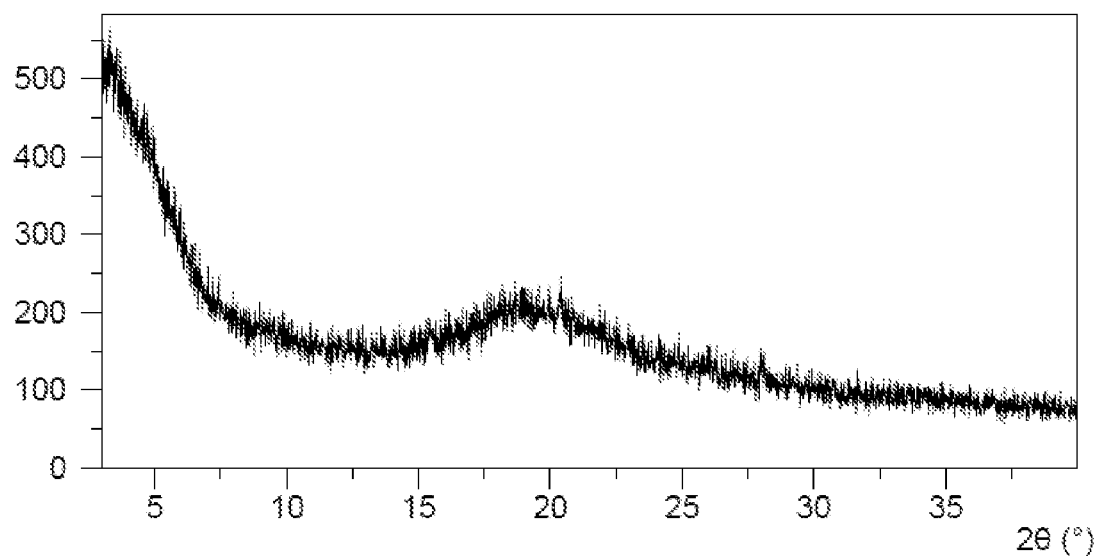
FIG. 21 is the XPRD pattern of the amorphous form XI of the nicotinate of formula 1.
Figure 22:
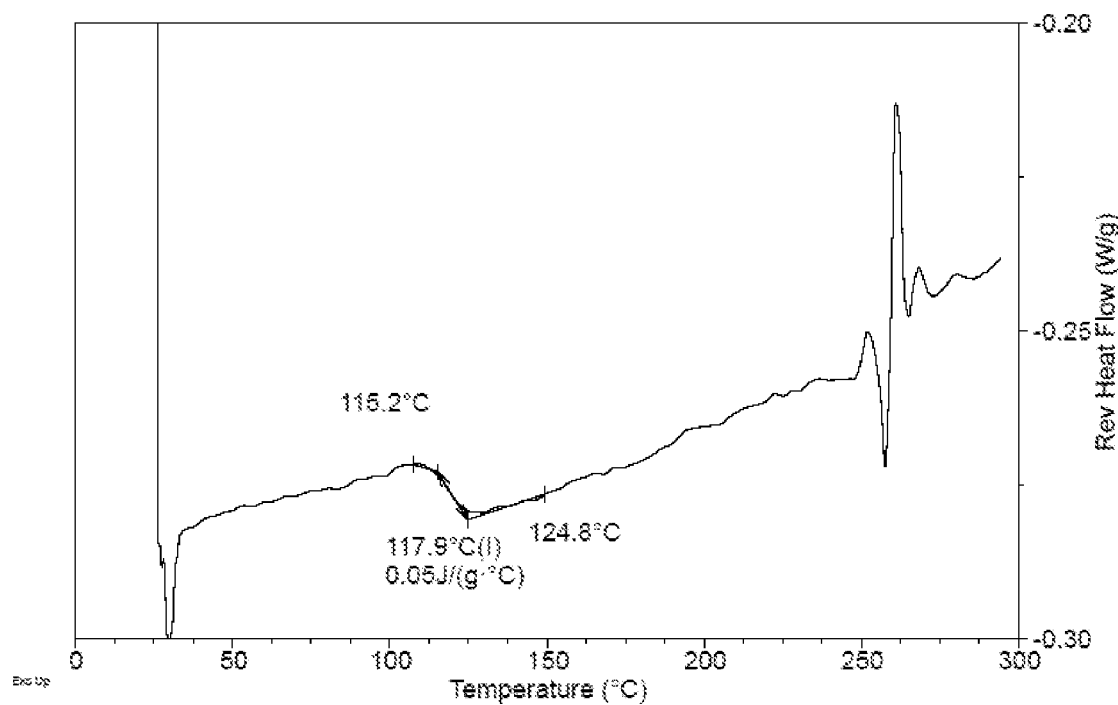
FIG. 22 is an MDSC chart of amorphous form XI of the nicotinate of formula 1.
Figure 23:
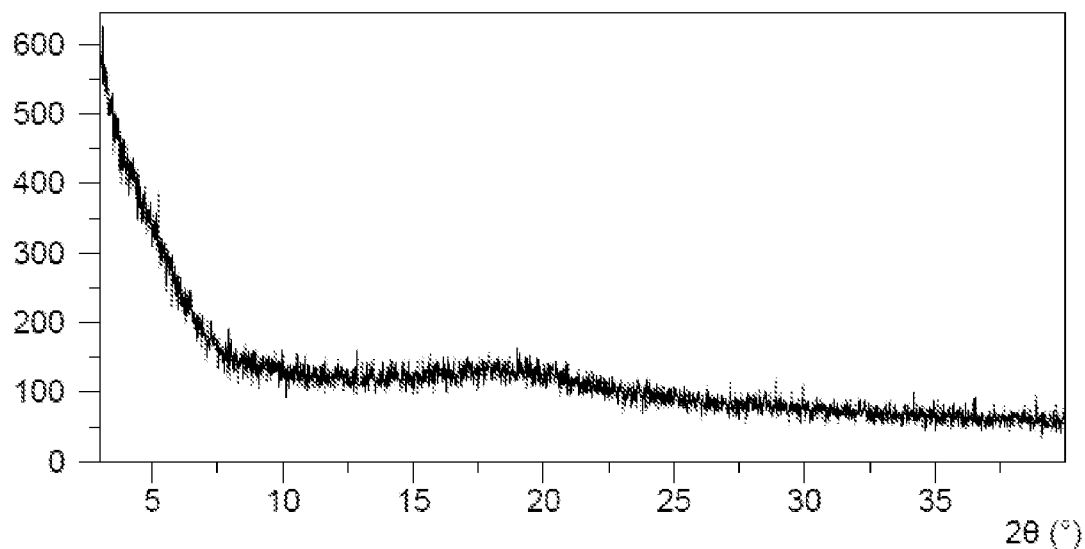
FIG. 23 is the XPRD pattern of the amorphous form XII of the potassium salt of formula 1.
Figure 24:
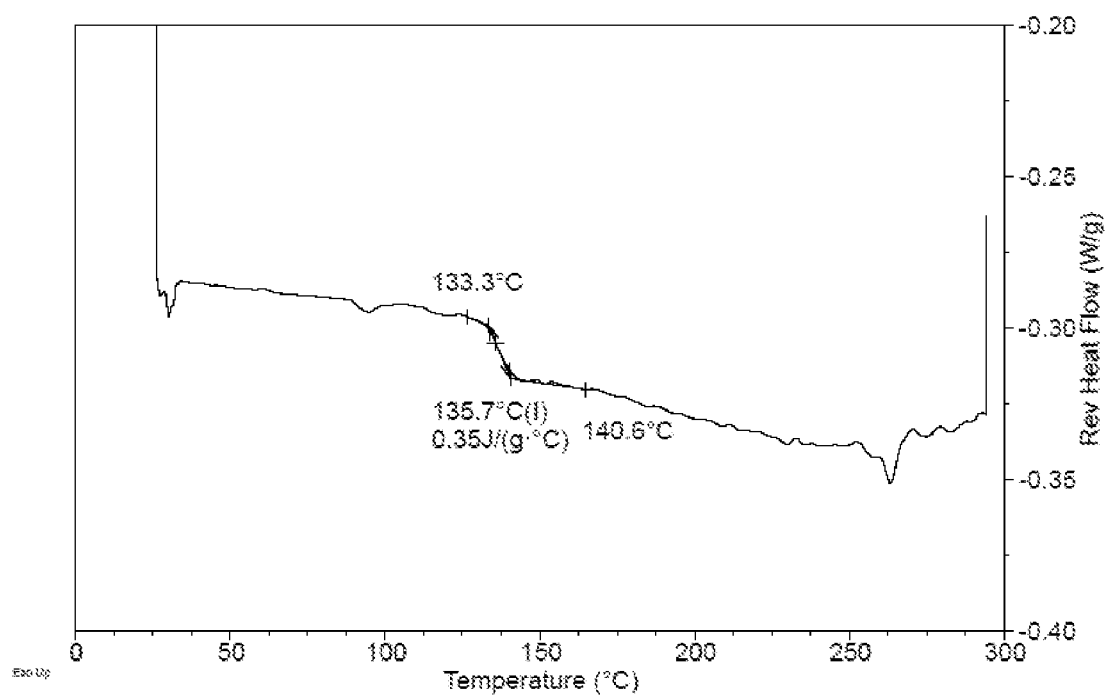
FIG. 24 is the MDSC chart of the amorphous form XII of the potassium salt of formula 1.
Figure 25:
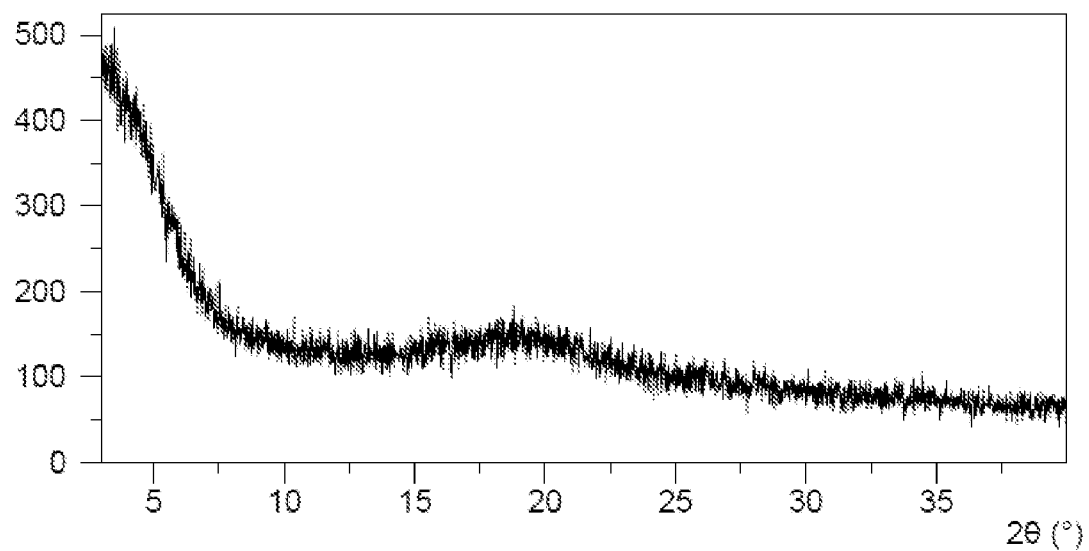
FIG. 25 is the XPRD pattern of the amorphous form XIII of the sodium salt of formula 1.
Figure 26:
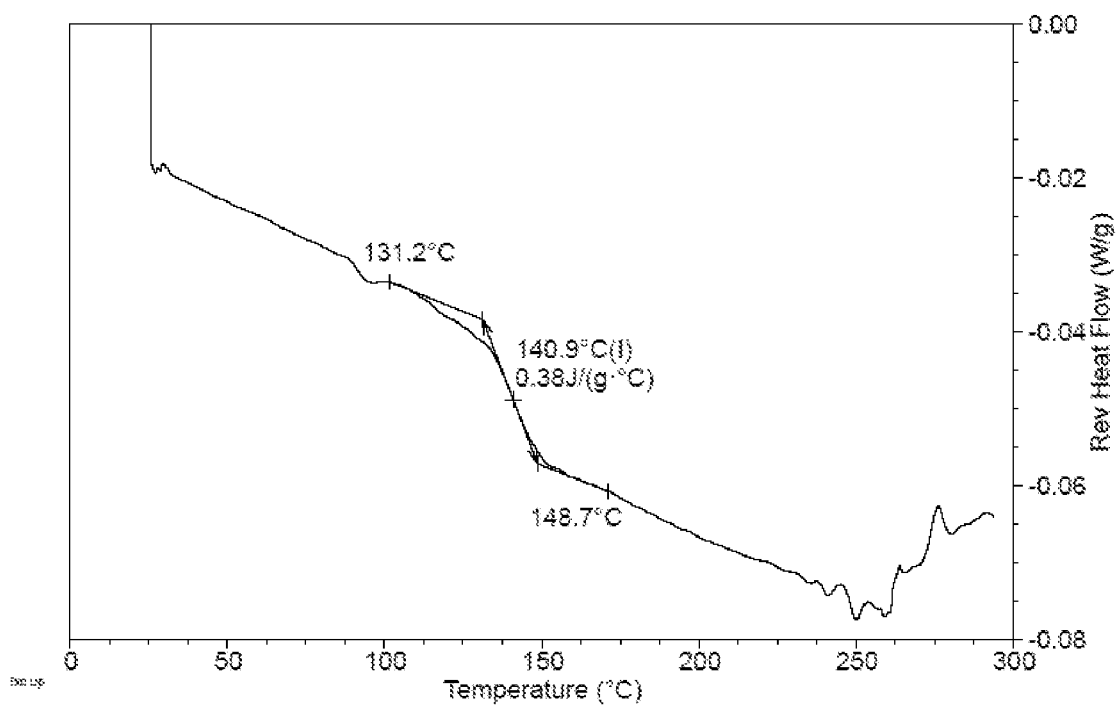
FIG. 26 is the MDSC chart of the amorphous form XIII of the sodium salt of formula 1.
Figure 27:
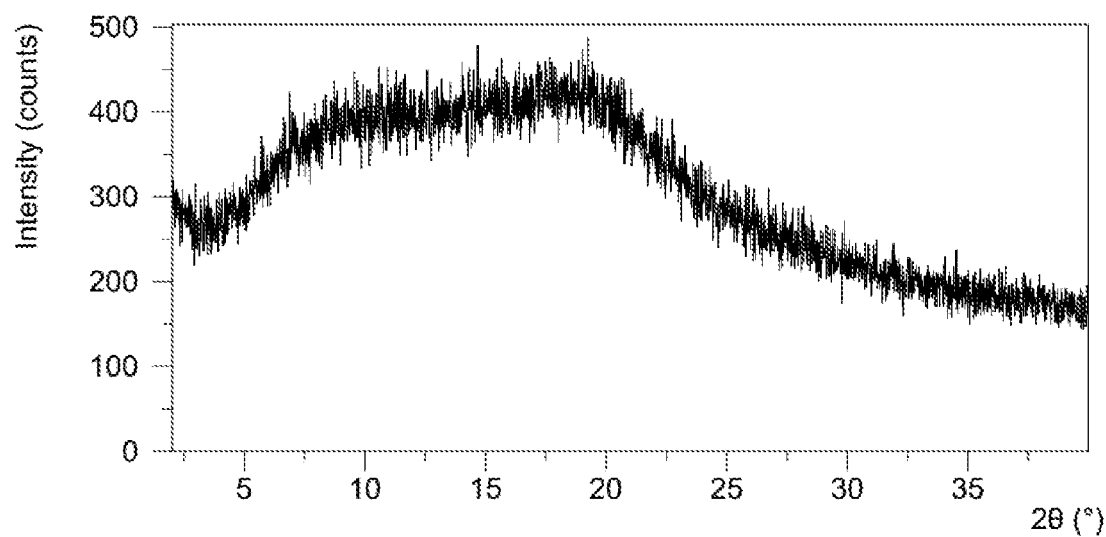
FIG. 27 is the XPRD pattern of the amorphous form XIV of formula 1.
Figure 28:
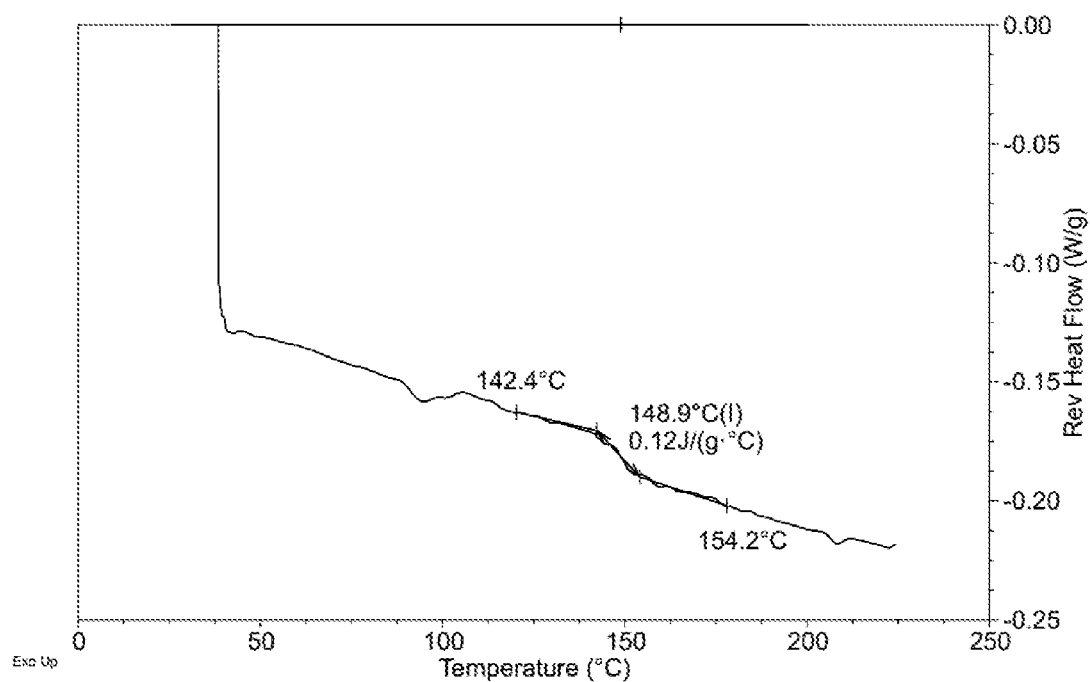
FIG. 28 is the MDSC chart of the amorphous form XIV of formula 1.
Figure 29:
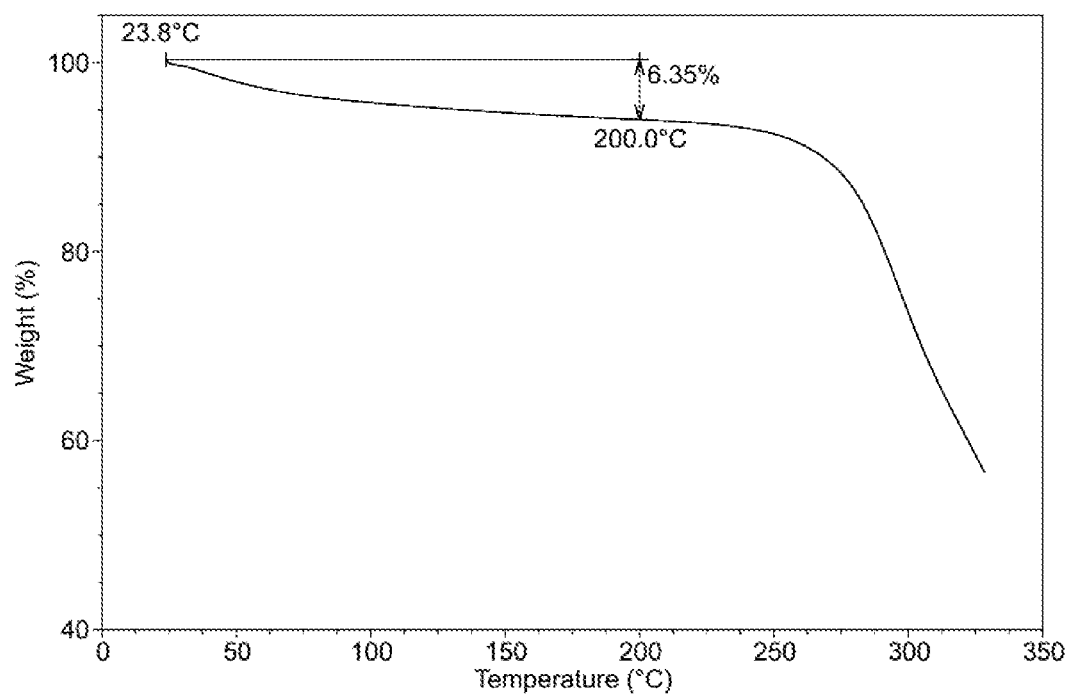
FIG. 29 is the TGA chart of the amorphous form XIV of formula 1.
Figure 30:
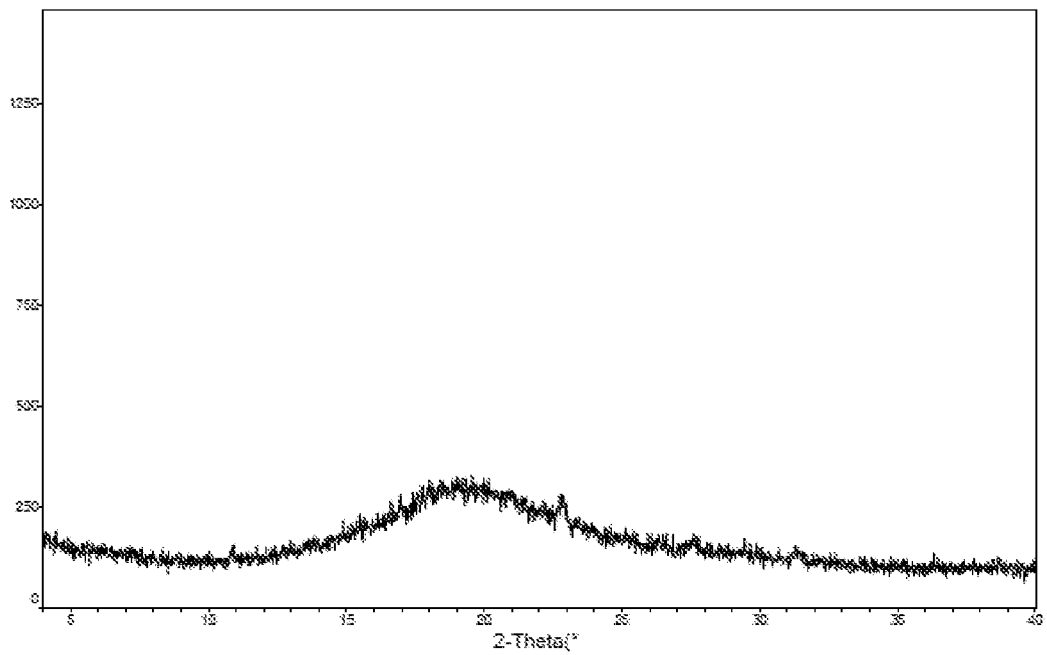
FIG. 30 is the XPRD pattern of the amorphous form XV of the maleate salt of formula 1.
Figure 31:
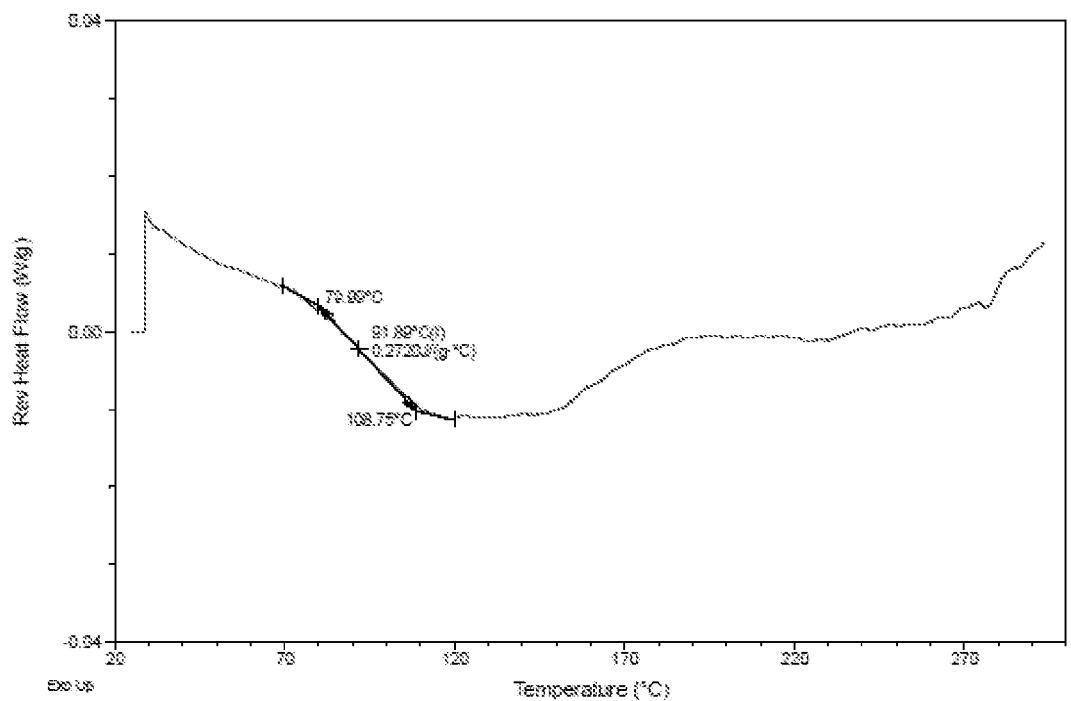
FIG. 31 is the MDSC chart of the amorphous form XV of the maleate salt of formula 1.
Figure 32:
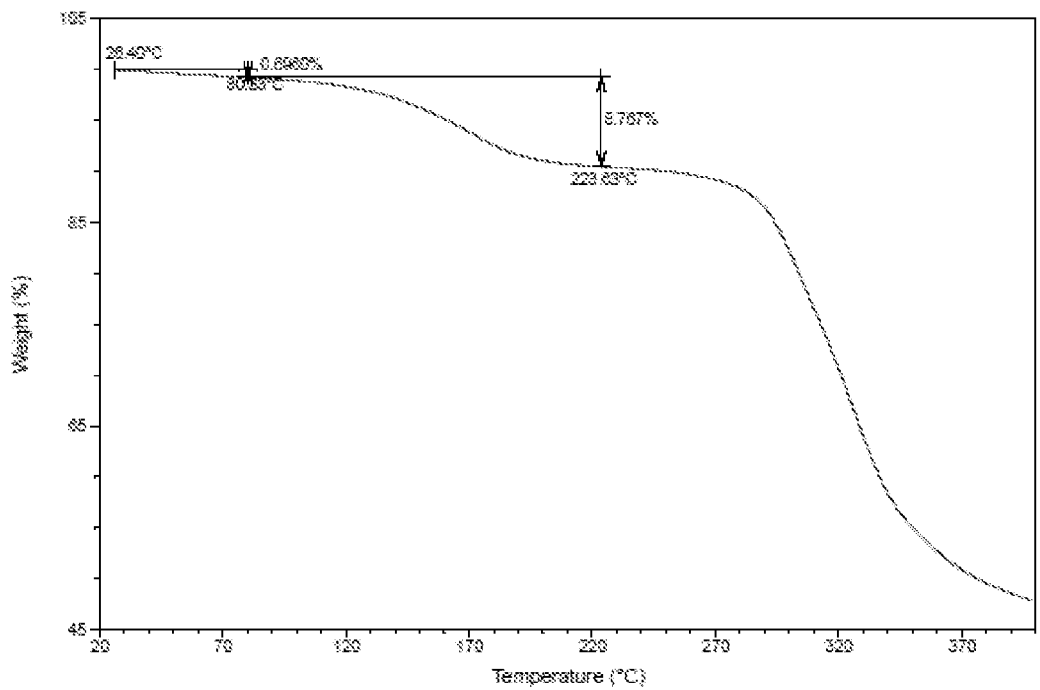
FIG. 32 is the TGA chart of the amorphous form XV of the maleate salt of formula 1.
Figure 33:
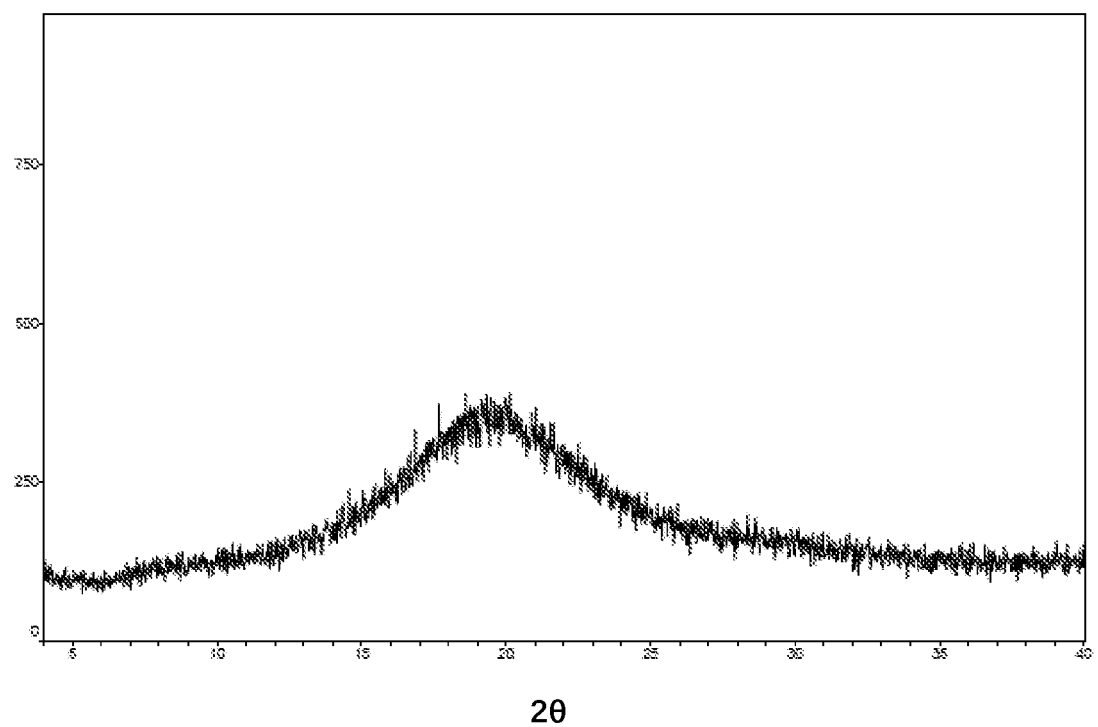
FIG. 33 is the XPRD pattern of the amorphous form XVI of the meglumine salt of formula 1.
Figure 34:
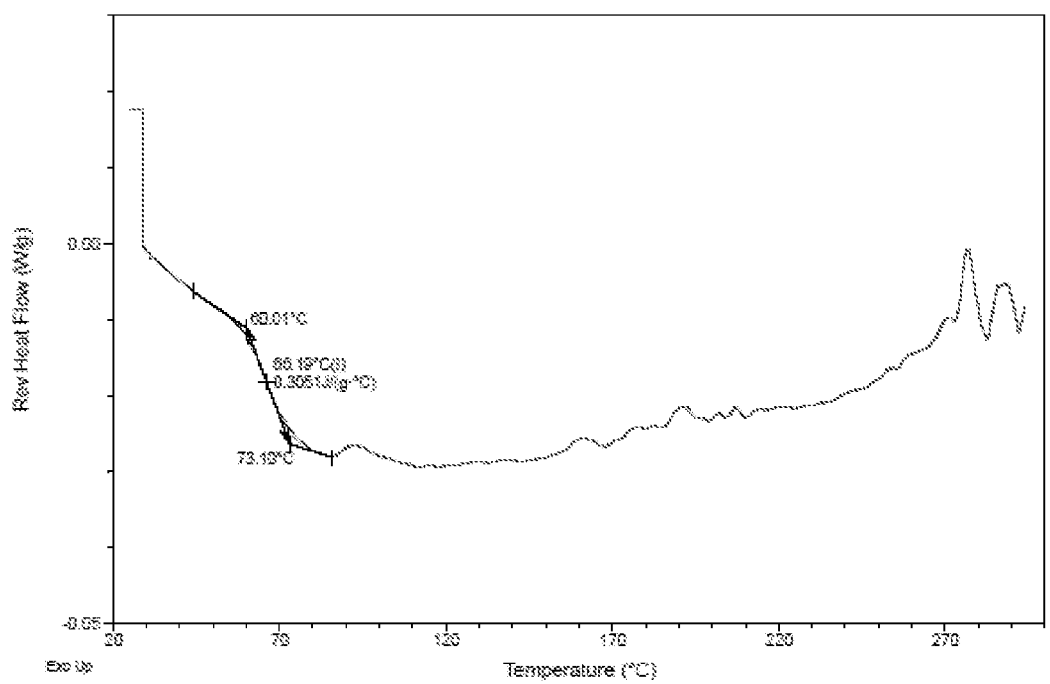
FIG. 34 is the MDSC chart of the amorphous form XVI of the meglumine salt of formula 1.
Figure 35:
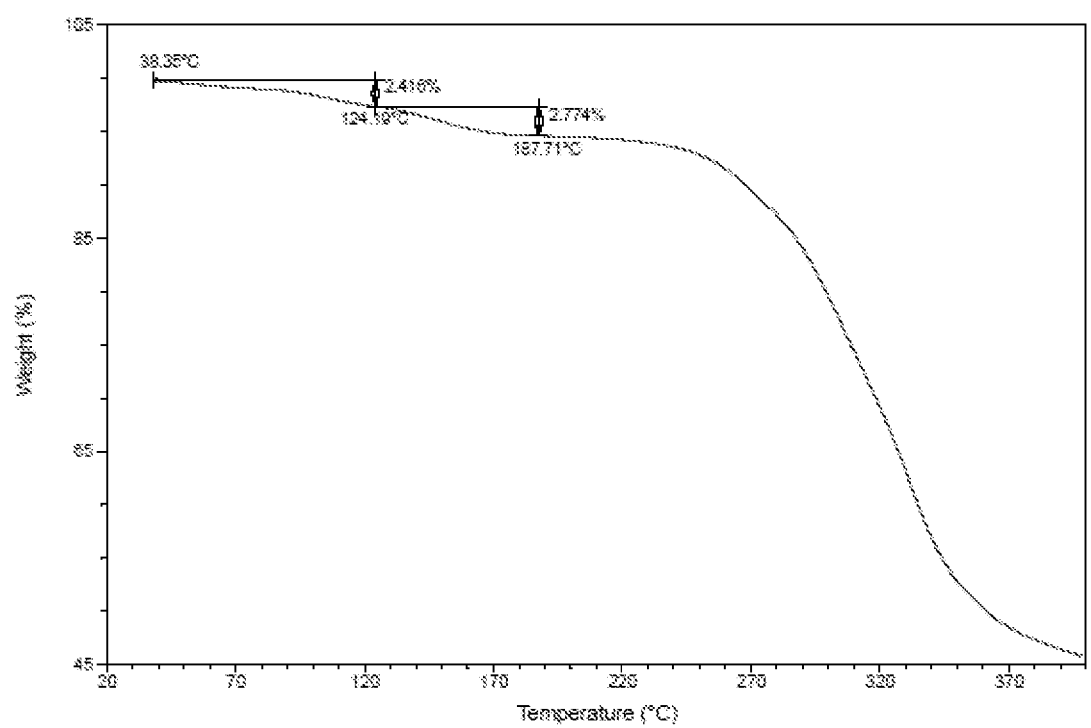
FIG. 35 is the TGA graph of the amorphous form XVI of the meglumine salt of formula 1.

2. Differential Scanning Calorimetry (DSC)
   Instrument: TA Q200/Q2000 differential scanning calorimeter provided by TA Instruments
   Test method: The sample is placed in an aluminum pan, and the temperature is increased from room temperature to the set temperature at a rate of 10° C./min under $N_2$ protection after pressing the lid.
3. Modulation Differential Scanning Calorimetry (MDSC)
   Instrument: TA Q200/Q2000 differential scanning calorimeter provided by TA Instruments
   Measurement method: The sample is placed in an aluminum pan, and after pressing the cover, it is heated from room temperature to the set temperature at a rate of 10° C./min under the protection of N2, and then kept at a constant temperature for 10 minutes, and then cooled to 35° C. at a rate of 15° C./min. The temperature is raised to the specified temperature with a heating rate of 3° C./min, a modulation period of 60 s, and a modulation amplitude of ±1° C.
4. Thermogravimetric Analysis (TGA)
   Instrument: TA Q500/Q5000 thermogravimetric analyzer provided by TA Instruments
   Measurement method: The sample is placed in an alloy pan, and the opening is heated from room temperature to the set temperature at a rate of 10° C./min under the protection of $N_2$.
   For the identification and characterization results of XPRD, TGA and (M)DSC, please refer to FIG. 1-35, Table 1-8 and related text description.

Each reference, including all patents, patent applications, and publications cited in this application, is incorporated herein by reference in its entirety, as if each of them were individually incorporated. In addition, it will be understood that in the above teachings of the present invention, those skilled in the art can make certain changes or modifications to the present invention, and these equivalents will still fall within the scope of the present invention defined by the appended claims of the application.

What is claimed is:

1. A crystalline or amorphous form of the compound of formula 1 or its salt:

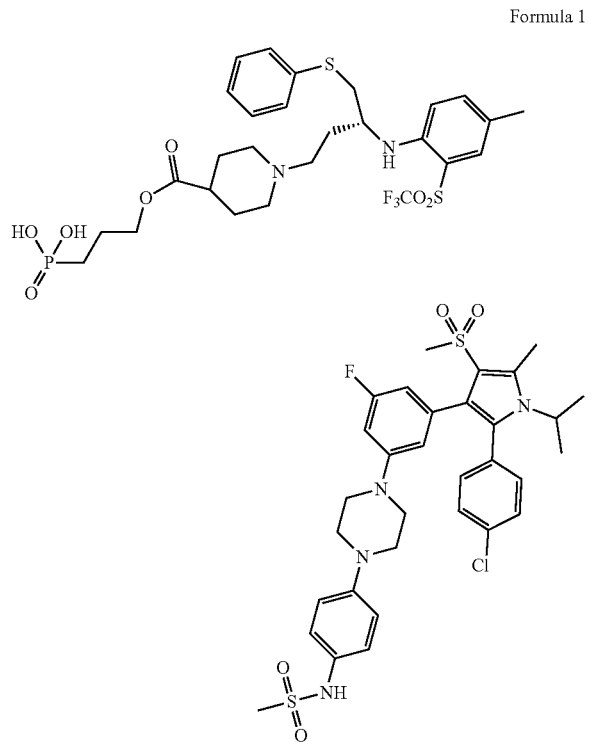

wherein the form is selected from the group consisting of:
a fumarate salt crystalline form I of the compound of formula 1, having an X-ray powder diffraction (XRPD) pattern comprising peaks at angles 2θ of 18.03±0.2°, 28.81±0.2°, and 31.88±0.2°;
a hydrochloride salt crystalline form II of the compound of formula 1, having an X-ray powder diffraction (XRPD) pattern comprising peaks at angles 2θ of 13.01±0.2°, 21.55±0.2°, 25.95±0.2°, and 31.33±0.2°;
a nicotinate crystalline form III of the compound of formula 1, having an X-ray powder diffraction (XRPD) pattern comprising peaks at angles 2θ of 15.46±0.2° and 18.06±0.2°;
a sodium salt crystalline form IV of the compound of formula 1, having an X-ray powder diffraction (XRPD) pattern comprising peaks at angles 2θ of 16.75±0.2°, 32.34±0.2°, 33.48±0.2° and 37.95±0.2°;
a potassium salt crystalline form V of the compound of formula 1, having an X-ray powder diffraction (XRPD) pattern comprising peaks at angles 2θ of 24.35±0.2°, 30.10±0.2° and 31.41±0.2°;
a crystalline form VI of the compound of formula 1, having an X-ray powder diffraction (XRPD) pattern comprising peaks at angles 2θ of 3.94±0.2°, 5.09±0.2°, 18.01±0.2°, and 19.08±0.2°, 19.70±0.2°;
a crystalline form VII of the compound of formula 1, having an X-ray powder diffraction (XRPD) pattern comprising peaks at angles 2θ of 20.18±0.2°, 20.74±0.2°, 29.20±2 0.2°, 29.28±0.2°, and 36.73±0.2°;
a crystalline form VIII of the compound of formula 1, having an X-ray powder diffraction (XRPD) pattern comprising a peak at angle 2θ of 18.11±0.2°;
an adipate salt amorphous form IX of the compound of formula 1, wherein the form has a glass transition temperature at 113.4±2.0° C. measured by MDSC;
an fumarate amorphous form X of the compound of formula 1, wherein the form has a glass transition temperature at 136.6±12.0° C. measured by MDSC;
a nicotinic acid salt amorphous form XI of the compound of formula 1, wherein the form has a glass transition temperature at 117.9±2.0° C. measured by MDSC;
an amorphous form XII of the potassium salt of the compound of formula 1, wherein the form has a glass transition temperature at 135.7±2.0° C. measured by MDSC;
an amorphous form XIII of the sodium salt of the compound of formula 1, wherein the form has a glass transition temperature at 140.9±2.0° C. measured by MDSC;
an amorphous form XIV of the compound of formula 1, wherein the form has a glass transition temperature at 148.9±2.0° C. measured by MDSC;
an amorphous form XV of the maleate salt of the compound of formula 1, wherein the form has a glass transition temperature at 91.89±2.0° C. measured by MDSC; and
an amorphous form XVI of the meglumine salt of the compound of formula 1, wherein the form has a glass transition temperature at 66.19±2.0 measured by MDSC.

2. The form of claim 1, wherein the form is the fumarate salt crystalline form I.

3. The form of claim 1, wherein the form is the hydrochloride salt crystalline form II.

4. The form of claim 1, wherein the form is the nicotinate crystalline form III.

5. The form of claim 1, wherein the form is the sodium salt crystalline form IV.

6. The form of claim 1, wherein the form is the potassium crystalline form V.

7. The form of claim 1, wherein the form is the crystalline form VI.

8. The form of claim 1, wherein the form is the crystalline form VII.

9. The form of claim 1, wherein the form is the crystalline form VIII.

10. The form of claim 1, wherein the form is the adipate salt amorphous form IX.

11. The form of claim 1, wherein the form is the fumarate amorphous form X.

12. The form of claim 1, wherein the form is the nicotinic acid salt amorphous form XI.

13. The form of claim 1, wherein the form is the potassium salt amorphous form XII.

14. The form of claim 1, wherein the form is the sodium salt amorphous form XIII.

15. The form of claim 1, wherein the form is the amorphous form XIV.

16. The form of claim 1, wherein the form is the maleate salt amorphous form XV.

17. The form of claim 1, wherein the form is the meglumine salt amorphous form XVI.

18. A pharmaceutical composition comprising the crystalline or amorphous form of the compound of Formula 1 or its salt according to claim 1, and pharmaceutically acceptable excipients.

19. A method for preparing the amorphous form XIV of the compound of formula 1 according to claim 15, wherein the method comprises:
adding the compound of formula 1 to a solvent to obtain a solution, adding the obtained solution to an anti-solvent, and separating the obtained solid to obtain the amorphous form XIV of compound of formula 1;
wherein the solvent is selected from one or more of ethyl acetate, acetone, tetrahydrofuran, acetonitrile, DMSO, 1,4-dioxane, MIBK, dichloromethane, and DMF; and
wherein the anti-solvent is selected from one or more of heptane, ethanol, water, IPAc, IPA, butanol, and NPA.

20. A method of treating a Bcl-2 or Bcl-xL disease, comprising administering the crystalline form or amorphous form of the compound of formula 1 or its salt according to claim 1 to a patient in need thereof.

21. The method of claim 20, wherein the Bcl-2 or Bcl-xL disease is selected from the group consisting of bladder cancer, breast cancer, colon cancer, kidney cancer, liver cancer, lung cancer, ovarian cancer, prostate cancer, testicular cancer, genitourinary tract cancer, lymphatic system cancer, rectal cancer, Laryngeal cancer, pancreatic cancer, esophageal cancer, gastric cancer, gallbladder cancer, cervical cancer, thyroid cancer, skin cancer; hematopoietic tumors of the lymphatic system, including leukemia, acute lymphoblastic leukemia, acute lymphoblastic leukemia, B-cell lymph Tumor, T-cell lymphoma, Hodgkin's lymphoma, non-Hodgkin's lymphoma, hair cell lymphoma, histiocytic lymphoma and Burketts lymphoma; hematopoietic tumors of the bone marrow line, including acute and chronic myelogenous leukemia, bone marrow Dysplasia syndrome, myelogenous leukemia and promyelocytic leukemia; tumors of the central and peripheral nervous system, including astrocytoma, neuroblastoma, glioma and schwannoma; tumors of mesenchymal origin, Including fibrosarcoma, rhabdomyosarcoma and osteosarcoma; and other tumors, including melanoma, xeroderma pigmentosum, keratoacanthoma, seminoma, thyroid follicular carcinoma, teratoma, renal cell carcinoma (RCC), Myeloma, myelogenous and lymphoblastic leukemia, neuroblastoma and glioblastoma.

* * * * *